US 6,714,689 B1

(12) United States Patent
Yano et al.

(10) Patent No.: US 6,714,689 B1
(45) Date of Patent: *Mar. 30, 2004

(54) IMAGE SYNTHESIZING METHOD

(75) Inventors: Koutaro Yano, Yokohama; Hideo Takiguchi, Kawasaki; Tatsushi Katayama, Tokyo; Kenji Hatori, Hatogaya, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 315 days.

(21) Appl. No.: 08/723,825

(22) Filed: Sep. 30, 1996

(30) Foreign Application Priority Data

Sep. 29, 1995 (JP) ............................................. 7-275091
Sep. 9, 1996 (JP) ............................................. 8-237671

(51) Int. Cl.$^7$ ................................................. G06K 9/36
(52) U.S. Cl. ....................................... 382/284; 382/294
(58) Field of Search ................................. 382/284, 294; 395/135; 345/115; 358/450; 348/584, 586, 598, 600, 589, 594, 595, 601

(56) References Cited

U.S. PATENT DOCUMENTS 3,976,982 A * 8/1976 Eiselen ....................... 382/293
5,465,163 A * 11/1995 Yoshihara et al. ........... 358/444
5,581,377 A * 12/1996 Shimizu et al. .............. 358/540
5,586,246 A * 12/1996 Nobori et al. ............... 395/502
5,625,710 A * 4/1997 Katsuyama et al. ......... 382/209
5,742,294 A * 4/1998 Watanabe et al. ........... 345/425

* cited by examiner

Primary Examiner—Yon J. Couso
(74) Attorney, Agent, or Firm—Fitzpatrick, Cella, Harper & Scinto

(57) ABSTRACT

An image synthesizing method for synthesizing a plurality of images partially overlapping with each other, having the steps of inputting a plurality of image data each corresponding to a plurality of images, extracting a matching point of duplicate areas of desired two images partially overlapping with each other among a plurality of images of the plurality of input image data, and sequentially detecting a position relationship between two images in accordance with the extracted matching point, detecting the position relationships of all images in accordance with the position relationship between two images sequentially detected by the position relationship detecting step, and synthesizing the images of the plurality of input image data in accordance with the position relationships of all images detected by the all image position relationship detecting step to form a synthesized image.

18 Claims, 14 Drawing Sheets a8　　　　　　　b8 a4 a4　　　　　　　b4

FIG. 16
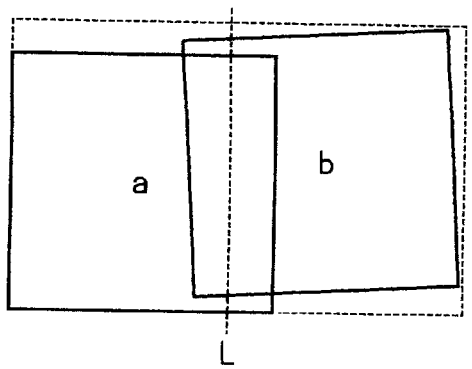
FIG. 17
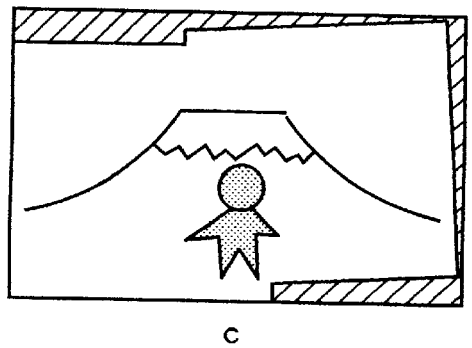
FIG. 19
| -2 | -1 | -2 |
|---|---|---|
| -1 | 12 | -1 |
| -2 | -1 | -2 |
FIG. 21
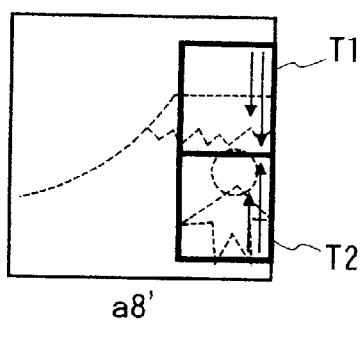
FIG. 22
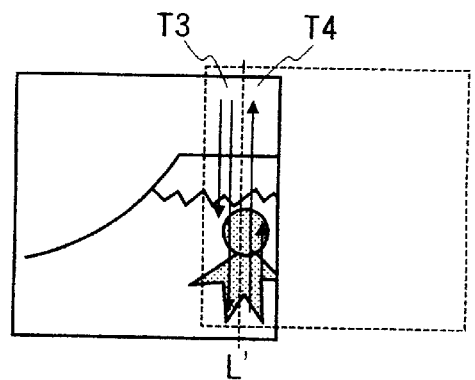

IMAGE SYNTHESIZING METHOD

BACKGROUND OF THE INVENTION

1. Field of the Invention

The present invention relates to an image synthesizing method of synthesizing a plurality of images each including a duplicate image area to form a single synthesized image.

2. Related Background Art

As a method of synthesizing a plurality of images to form an image having a wide angle of view, a method is known by which two images are synthesized by designating matching points in overlapping area of the two images and putting one matching point over the other. With this method, the matching points of the two images are required to be designated by a mouse or the like and this operation is cumbersome.

Extracting matching points may be executed automatically by template matching or the like to detect the positional relationship between two images and synthesize them.

Such conventional techniques, however, are associated with the following problems because a synthesizing process for two images is required to be executed a plurality of times if a panorama image of 360 degrees is to be formed by synthesizing images taken with an ordinary taking lens or if a large image with a high resolution is to be synthesized.

For example, in synthesizing four images, first a synthesized image of first and second images is formed, and then another synthesized image is formed from third and fourth images. The two synthesized images are synthesized to form a final synthesized image of the four images.

In this case, image data is required to be synthesized after the positional relationships between the first and second images, between the third and fourth images, and between the two synthesized images, are detected.

It is not so difficult to synthesize four images if the positional relationships between all images are known in advance. However, since a synthesizing process for two images is performed a plurality of times to synthesize image data, the process efficiency is poor.

If the matching points are automatically extracted by template matching or the like to detect the positional relationship between two images, two images are required to be designated at each of a plurality of synthesizing processes for two images. Therefore, even if the matching points are not required to be manually designated, the operation is cumbersome.

As a method of synthesizing a plurality of images to form an image having a wide angle of view, a method is known by which two images are synthesized by subjecting the two images to geometric conversion such as affine transformation so as to make the two same points in the duplicate areas of the two images coincide with each other.

With this conventional technique, however, it is necessary to recognize the duplicate areas of two images and extract the same two points (hereinafter called matching points) from the duplicate areas. This operation may be performed by displaying two images to be synthesized on a display screen and designating the matching points in the two images with a mouse or the like. With this method, however, the matching points are required to be manually designated so that the operation is not simple and some skill is necessary.

Template matching is a method of automatically extracting the matching points from two images. With this method, one image is divided into small areas and each area is compared with the other image to detect the matching points which are images most analogous to each other.

With this template matching, if the duplicate areas of two images to be synthesized are not designated in advance, erroneous matching points may be extracted in some cases from the areas other than the duplicate areas of the two images. Therefore, an extraction precision of matching points is lowered. With a lowered extraction precision of matching points, two images cannot be synthesized correctly.

Also with this template matching, if a broad duplicate area of one image is designated as a search area of a matching point and this broad duplicate area contains many analogous areas, it takes a long time to extract the matching points from the designated two duplicate areas, and therefore the two images cannot be synthesized quickly.

SUMMARY OF THE INVENTION

It is an object of the present invention to provide an image synthesizing method capable of solving the above problems.

It is another object of the present invention to provide an image synthesizing method capable of efficiently synthesizing three or more images with simple operations.

Under the above objects, according to one embodiment of the present invention, an image synthesizing method for synthesizing a plurality of images partially overlapping with each other is provided which comprises the steps of: inputting a plurality of image data each corresponding to a plurality of image, extracting a matching point of duplicate areas of desired two images partially overlapping with each other among a plurality of images represented by the plurality of input image data, and sequentially detecting a position relationship between two images in accordance with the extracted matching point; detecting the position relationships of all images in accordance with the position relationship between two images sequentially detected by the position relationship detecting step; and synthesizing the images represented by the plurality of input image data in accordance with the position relationships of all images detected by the all image position relationship detecting step to form a synthesized image.

It is another object of the present invention to provide an image synthesizing method capable of synthesizing three or more images and forming a synthesized image having a good image quality at a desired image area, with simple operations.

Under the above objects, according to one embodiment of the present invention, an image synthesizing method for synthesizing a plurality of images partially overlapping with each other is provide which comprises the steps of: inputting a plurality of image data each corresponding to a plurality of images and arranging the plurality of images of the plurality of input image data in a display area; extracting a matching point of duplicate areas of desired two images partially overlapping with each other among a plurality of images arranged at the arranging step and sequentially detecting a position relationship between two images in accordance with the extracted matching point; forming a data list of an order of detecting the position relationship, an image associated with the matching point, and a position of the image associated with the matching point in the display area, in accordance with the position relationship between two images in the display area sequentially detected by the position relationship detecting step; detecting the position relationships of all images from the position relationship between two images sequentially detected, in accordance with the data list formed by the data list forming step; and synthesizing the images of the plurality of input image data in accordance with the position relationships of all images detected by the all image position relationship detecting step to form a synthesized image.

It is another object of the present invention to provide an image synthesizing method capable of automatically and precisely synthesizing a plurality of images without complicated operations.

Under the above objects, according to one embodiment of the present invention, an image synthesizing method for synthesizing a plurality of images partially overlapping with each other is provided which comprises the steps of: inputting a plurality of image data each corresponding to a plurality of images, stepwise reducing the plurality of images of the plurality of input image data at different reduction factors and generating a plurality of reduced image data of the reduced images; stepwise extracting a matching point of images of the reduced image data generated by the reduced image data generating step and sequentially from the reduced image data of a reduced image having a largest reduction factor to equal-size image data of an image having the same size as the image represented by the plurality of input image data; setting various parameters necessary for image conversion synthesization in accordance with the matching point extracted by the matching point extracting step; if the various parameters set by the parameter setting step are for a reduced image of the reduced image data at the matching point extracting step, estimating a duplicate area of a plurality of images of the reduced image data having a one-step higher reduction factor by using the matching point extracted by the matching point extracting step and the various parameters set by the parameter setting step, setting as a template of a small area for extracting the matching point in each reduced image among the plurality of reduced images, and extracting at the matching point extracting step the matching point in the plurality of reduced images of the size reduced image data having the one-step higher reduction factor, whereas if the various parameters set by the parameter setting step are for an image of the equal-size image data at the matching point extracting step, converting at least one image among the plurality of images of the plurality of input image data to synthesize with another image.

It is a further object of the present invention to provide an image synthesizing method capable of automatically and precisely synthesizing a plurality of images in a short processing time.

Under the above objects, according to one embodiment of the present invention, an image synthesizing method for synthesizing a plurality of images partially overlapping with each other is provided which comprises the steps of: inputting a plurality of image data each corresponding to a plurality of images, stepwise reducing the plurality of images of the plurality of input image data at different reduction factors, and generating a plurality of reduced image data of the reduced images; extracting a feature image of the reduced image of the reduced image data generating step from the reduced image data generated by the reduced data generating step and generating reduced feature image data; stepwise extracting a matching point of images of feature images of the reduced feature image data generated by the feature image data generating step, sequentially from the reduced feature image data of a reduced image having a largest reduction factor to equal-size feature image data of a feature image having the same size as the image represented by the plurality of input image data; setting various parameters necessary for image conversion synthesization in accordance with the matching point extracted by the matching point extracting step; if the various parameters set by the parameter setting step are for a reduced feature image of the reduced feature image data at the matching point extracting step, estimating a duplicate area of a plurality of reduced images of the reduced image data having a one-step higher reduction factor by using the matching point extracted by the matching point extracting step and the various parameters set by the parameter setting step, setting as a template a small area for extracting the matching point in each reduced feature image among the plurality of reduced feature images, and extracting at the matching point extracting step the matching point in the plurality of reduced feature images of the reduced feature image data having the one-step higher reduction factor, whereas if the various parameters set by the parameter setting step are for an image of the equal-size feature image data at the matching point extracting step, converting at least one image among the plurality of images of the plurality of input image data to synthesize with another image.

The above and other objects of the present invention will become apparent from the following detailed description of embodiments of the invention when read in conjunction with the accompanying drawings.

BRIEF DESCRIPTION OF THE DRAWINGS

FIG. 16 is a diagram illustrating an image synthesizing method according to the third embodiment.

FIG. 17 is a diagram showing an example of a synthesized image according to the third embodiment.

FIG. 19 is a diagram showing a two-dimensional filter according to the fourth embodiment.

FIG. 21 is a diagram illustrating a method of cutting a template, to be executed by the matching point extraction unit according to the fourth embodiment.

FIG. 22 is a diagram illustrating a method of cutting a template, to be executed by the matching point extraction unit according to the fourth embodiment.

DETAILED DESCRIPTION OF THE PREFERRED EMBODIMENTS

Embodiments of the image synthesizing apparatus of the invention will be described.

Figure 1:
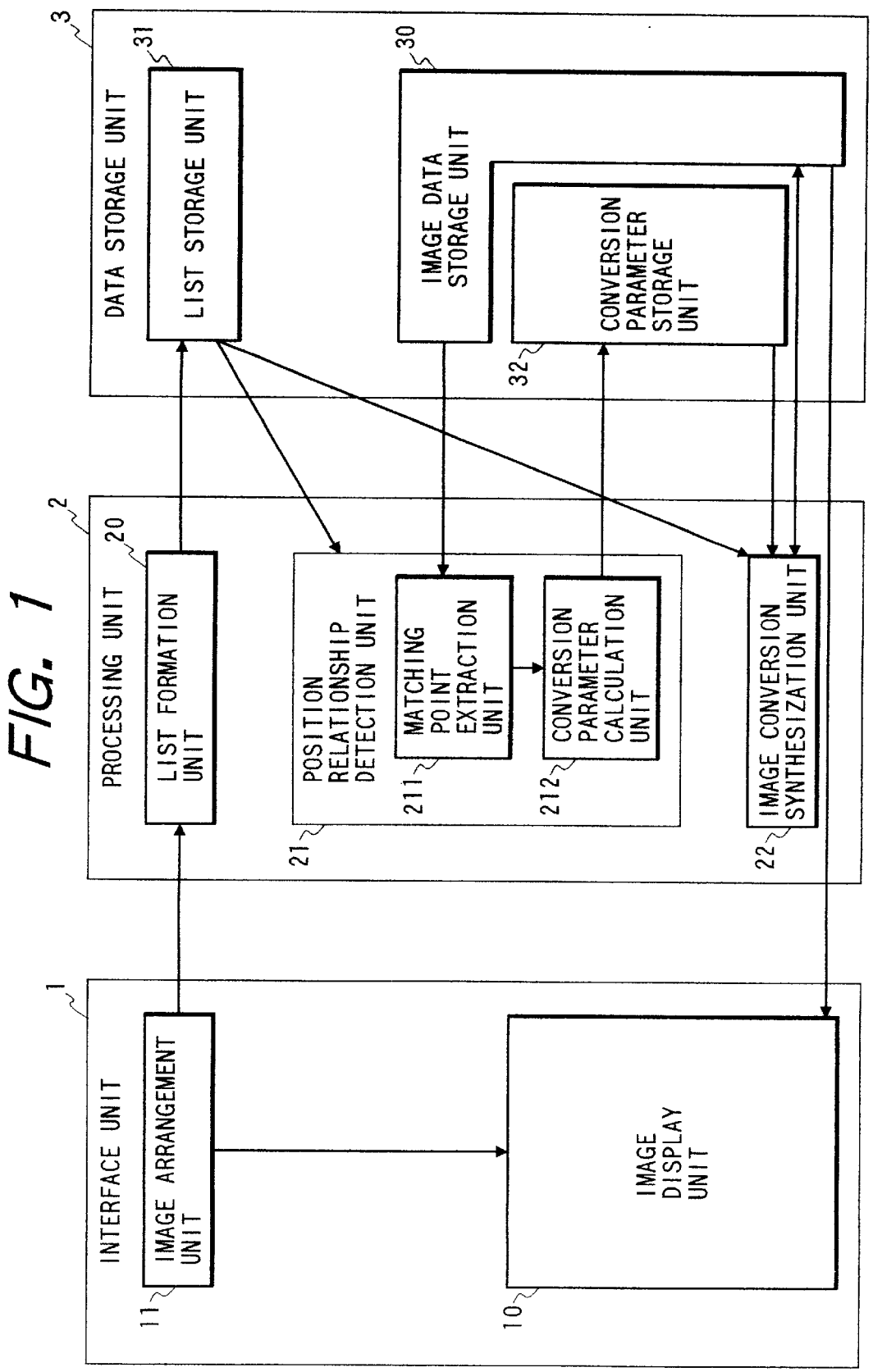
FIG. 1 is a block diagram showing the structure of an image synthesizing apparatus according to a first embodiment of the invention.

FIG. 1 is a block diagram showing the structure of an image synthesizing apparatus of the first embodiment. The image synthesizing apparatus is constituted by three parts including an interface unit 1, a processing unit 2, and a data storage unit 3. Each part is controlled by a control program to be executed by a computer.

The interface unit 1 is constituted by an image display unit and an image arrangement unit 11. The image display unit 10 displays images designated by a user and a synthesized image, on a work window used for image synthesization and displayed on a display screen of the computer. The image arrangement unit 11 moves a image displayed on the display screen by dragging a cursor to arrange the image at a desired position.

The processing unit 2 is constituted by a list formation unit 20, a position relationship detection unit 21, and an image conversion synthesization unit 22. The list formation unit 20 generates a process order and a list of images to be processed (hereinafter called a process list). The position relationship detection unit 21 is constituted by a matching point extraction unit 211 and a conversion parameter calculation unit 212, calculates the position relationship of two images, and outputs conversion parameters. The image conversion synthesization unit 22 synthesizes a plurality of bodies of image data to obtain one body of image data.

The data storage unit 3 is constituted by an image data storage unit 30, a list storage unit 31, and a conversion parameter storage unit 32, respectively for storing image data, process data, and conversion parameter.

Next, the operation of the image synthesizing apparatus will be described wherein image data of N frames are synthesized. When the main program for image synthesization is activated, the work window is displayed on the display screen of the computer. At the same time, a file list of image data stored in the image data storage unit 30 is displayed in a file management window.

A user selects image data to be synthesized from the file management window. The image data selected is referred to as image #1 hereinafter. The selected image data is read from the image data storage unit 30 and the image display unit 10 displays the image #1 in the work window. This operations are repeated N times to display images #1 to #N in the work window.

Next, the user rearranges N images displayed on the display screen by using the cursor. At this time, the image arrangement unit 11 instructs the image display unit 10 to move the displayed images in accordance with the user instruction with the cursor. The image display unit 10 displays the images again in accordance with the user instruction. At the same time, the image arrangement unit 11 stores arrangement information of the images in the work window rearranged by the user. When the user instructs to perform image synthesization by entering a command from a keyboard, the processing unit 2 synthesizes the images in accordance with the following procedure.

Figure 2:
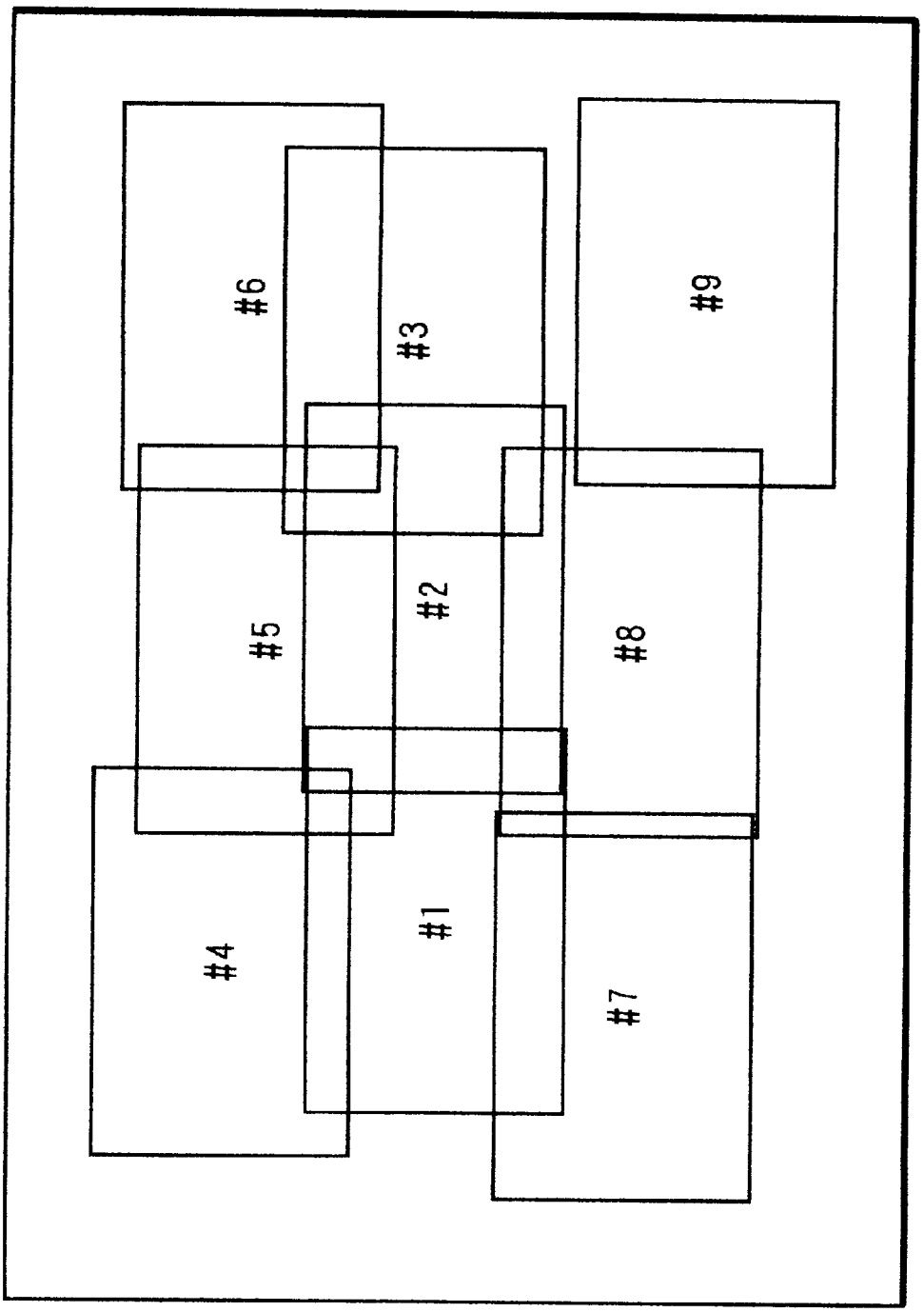
FIG. 2 is an illustrative diagram showing a work window with nine images to be synthesized being disposed therein.

The list formation unit 20 checks connections between the images by using the image #1 as a reference image, in accordance with the arrangement information of the image data. FIG. 2 is an illustrative diagram showing nine images to be synthesized, disposed in the work window. Forming the process list by the list formation unit 20 will be described by using nine images as synthesization example.

The list formation unit 20 searches a position relationship of the images in the work window by using the reference image, from the left, right, upper, and lower areas in the work window relative to the reference image. This search is performed through comparison with the arrangement information of the reference image and partner image. The arrangement information of each image #1 to #9 is represented by pos1 to pos9. The arrangement information contains vertical and horizontal position data (pos1x, pos1y) to (pos9x, pos9y), where (pos1x, pos1y)=(0, 0). The terms "pos 1" to "pos 9" represent arrangement position data of the centers of images #1 through #9 to be synthesized, respectively. For example, pos1 to pos9 may be coordinate data of the centers of images #1 through #9 in a screen, respectively. More specifically, "(pos1x, pos1y)" to "(pos9x, pos9y)" represent coordinate positions of the centers of images #1 through #9 in the horizontal and vertical directions, respectively.

The list formation unit 20 compares the arrangement information of the reference image and partner image, and searches for the left image, which if it exists, is positioned to the left in the horizontal direction, has a threshold value th1 or larger (i.e., satisfying the conditions (pos1x, posix)>th1 (i=2 to 9) and th1>0 where the right and under positions are positive), has a duplicate image area (i.e., satisfying the conditions (pos1x, posix)<w (i=2 to 9) and th1<w, where w is a horizontal width of the image, and has a vertical position shift of a minimum value among those with a threshold value th2 or smaller (i.e., |(pos1y, posiy)|<th2 (i=2 to 9). The threshold value th1 is about 1/4 of the horizontal width w and the threshold value th2 is about 1/4 of an image vertical width h. In the case of the example shown in FIG. 2, no left image of the image #1 exists.

Similar to the left image search, the right, upper, and lower images are searched. For the right image search, the arrangement information of the reference image is compared with the arrangement information of the partner image to search the right image, which is positioned to the right in the horizontal direction, has the threshold value th1 or larger, has a duplicate image area, and has a vertical position shift of a minimum value among those with a threshold value th2 or smaller.

For the upper image search, the arrangement information of the reference image is compared with the arrangement information of the partner image to search the upper image, which is at the upper position in the vertical direction, has the threshold value th2 or larger, has a duplicate image area, and has a horizontal position shift of a minimum value among those with a threshold value th1 or smaller.

For the lower image search, the arrangement information of the reference image is compared with the arrangement information of the partner image to search the lower image, which is at the lower position in the vertical direction, has the threshold value th2 or larger, has a duplicate image area, and has a horizontal position shift of a minimum value among those with a threshold value th1 or smaller.

Figure 3:
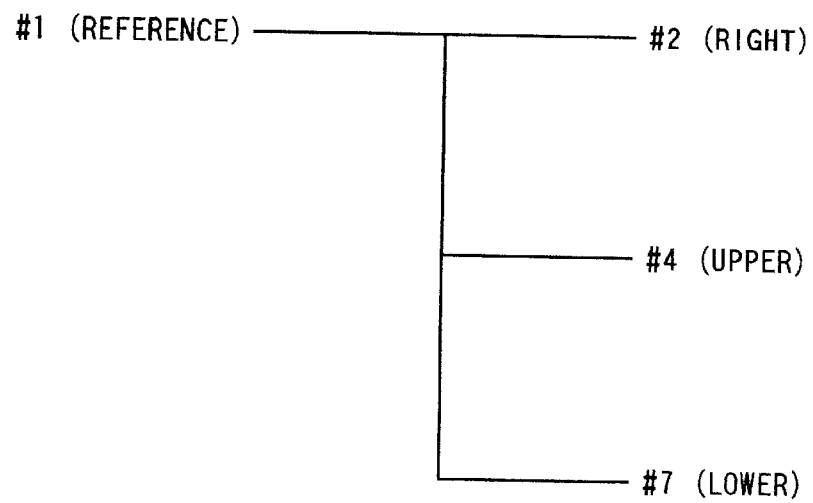
FIG. 3 is an illustrative diagram of a process list registered in a list storage unit.

Therefore, the image #2 is selected as the right image of the image #1, the image #4 is selected as the upper image, and the image #7 is selected as the lower image. The selection results are stored in the list storage unit 31. FIG. 3 is an illustrative diagram of the process list registered in the list storage unit 31. The list formation unit 20 judges at this stage whether all the images have been registered in the process list. If all are registered, the process is terminated. If not, with reference to the images registered in the process list, the similar process using the reference image is performed for the images still not registered in the process list, to thereby complete the process list. In this example, there are remaining images, and so the process continues.

Figure 4:
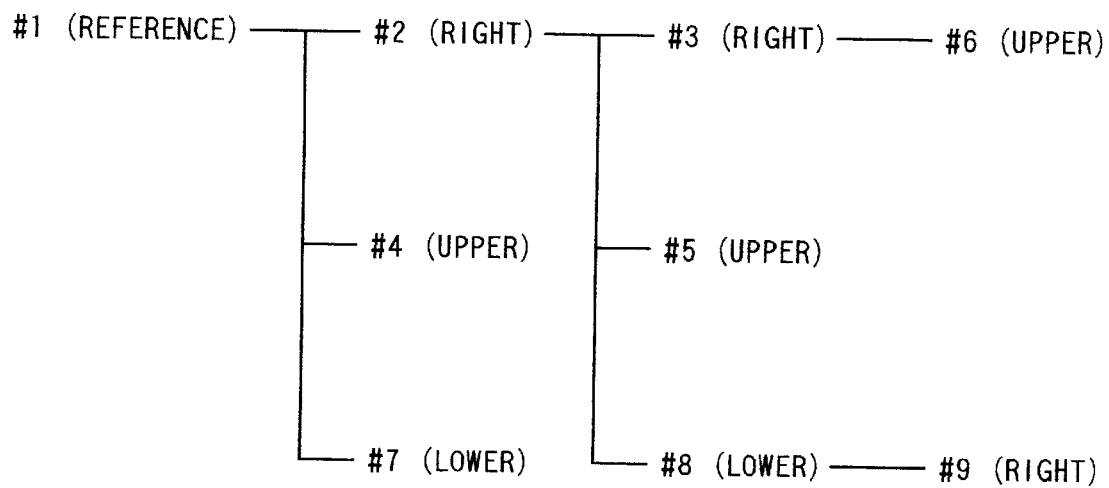
FIG. 4 is an illustrative diagram of a completed process list.

With this continued process, the image #3 is selected as the right image of the image #2, the image #5 is selected as the upper image, and the image #8 is selected as the lower image. This selection results are stored in the list storage unit 31. In this case, right, left, upper, and lower images for the images #3 and #7 cannot be found when they are searched for. Lastly, the image #6 is selected as the upper image of the image #3, and the image #9 is selected as the right image of the image #8. The selection results are stored in the list storage unit 31. After the list formation unit 20 confirms that all the images have been registered in the process list, it terminates the process. FIG. 4 is an illustrative view of the completed process list.

After the process list is formed, the position relationship detection unit 21 sequentially obtains the position relationship of two images in accordance with the completed process list. Specifically, with reference to the process list shown in FIG. 4, the position relationship is obtained in the order of images stored in the process list, i.e., in the sequential order of the images #1 and #2, images #1 and #4, images #1 and #7, images #2 and #3, images #2 and #5, images #2 and #8, images #3 and #6, and images #8 and #9.

Figure 5:
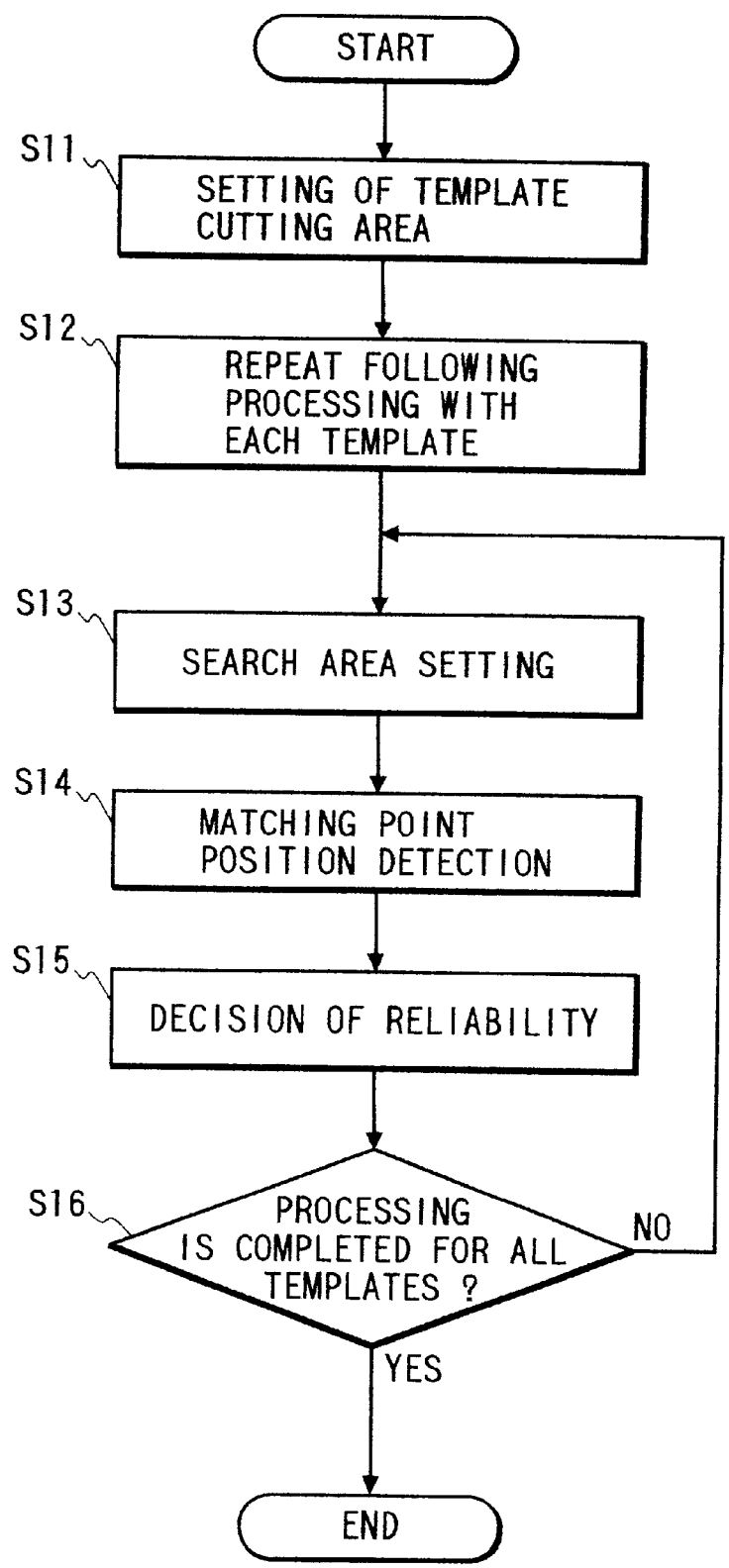
FIG. 5 is a flow chart illustrating a procedure of extracting a matching point, the procedure being executed by a matching point extraction unit.

The operations of the matching point extraction unit 211 and conversion parameter extraction unit 212 of the position relationship detection unit 21 will be described by taking as an example the position relationship of the images #1 and #2. FIG. 5 is a flow chart illustrating the procedure of extracting a matching point, to be executed by the matching point extraction unit 211. First, a template cutting area of the image #1 is set (step S11). The right side area is set as an approximate template cutting area with reference to the arrangement information of the images #1 and #2, and each template is cut as a small block area equal to about 10% of the image size.

For all cut templates, the following steps S13 to S15 are executed (step S12). Specifically, a search area for searching a point matching each cut template is set for the image #2 (step S13). In this case, since the duplicate area cannot be identified in advance, the search area is determined, from the arrangement information of the images #1 and #2, to be the left half area of the image #2 in the horizontal direction and the +/−10% area from the position of the template on the image #1 in the vertical direction. In this search area, the template is shifted in parallel to calculate a difference between the images #1 and #2. The position where a sum of absolute values of differences is minimum, is determined as the position of a matching point (step S14).

Reliability of the results obtained in step S14 is checked (step S15). It is checked whether the processes in steps S13 to S15 have been completed for all the cut templates (step S16). If not completed, the flow returns to step S13, whereas if completed, the process is terminated.

Judgment of the reliability in step S15 is performed by using the minimum sum of the absolute values of differences and the second smallest sum. In this embodiment, the matching point is judged reliable if the minimum sum of the absolute values of differences has a first predetermined threshold value th3 or smaller and a difference between the minimum sum and the second smallest sum of the absolute values of differences is a second threshold value th4 or larger. If it is judged reliable, the coordinates of the matching points in the images #1 and #2 are stored in a memory of the matching point extraction unit 211. In this embodiment, the position where the sum of the absolute values of differences is minimum, is used as the position of the matching point. The matching point position may alternatively be the position having the maximum correlation value obtained by a correlation calculation.

In the above description, the matching point extraction unit 211 extracts the matching points of the image #1 and the right image #2. In other cases, for example, in extracting the matching points of the image #1 and upper image #4, it is first confirmed from the process list that the image #4 is at the upper position of the image #1. At step S11, the template cutting area is set to the upper portion of the image #1, and at step S13 the search area is set to be the lower half area of the image #4 in the vertical direction and the +/−10% area from the position of the template on the image #1 in the horizontal direction.

Similarly, for the left and lower images, the matching points are extracted by setting the template cutting area and search area in accordance with the arrangement information.

Next, the conversion parameter calculation unit 212 estimates coordinate transformation parameters to be used for image synthesization in accordance with the extracted matching point positions. Affine transformation is used for coordinate transformation. Assuming that the image #2 has a position relationship, relative to the image #1, of θ rotation, (dx, dy) parallel motion, and m magnification, a point (x1, y1) in the image #1 corresponds to a point (x2, y2) in the image #2 indicated in the following equations (1).

$$\begin{aligned} x2 &= (\cos\theta \cdot x1 + \sin\theta \cdot y1 - dx) \times m \\ &= A \cdot x1 + B \cdot y1 + C \\ y2 &= (-\sin\theta \cdot x1 + \cos\theta \cdot y1 - dy) \times m \\ &= -B \cdot x1 + A \cdot y1 + D \end{aligned} \quad (1)$$

where A=m·cos θ, B=m·sin θ, C=−m·dx, and D=−m·dy.

The conversion parameter calculation unit 212 estimates the conversion parameters A, B, C, and D by a least square method. The obtained conversion parameters A, B, C, and D are stored in the conversion parameter storage unit 32.

Similar processes are sequentially performed for pairs of other images with reference to the process list to obtain position relationships. After all the position relationships for the images registered in the process list are obtained, the image conversion synthesization unit 22 executes an image synthesization process in accordance with the obtained conversion parameters.

In accordance with the conversion parameters stored in the conversion parameter storage unit 32 for each image in the process list, the image conversion synthesization unit 22 sets an area of the synthesized image for the reference image #1. The synthesized image area is represented by the right, left, upper, and lower corners thereof. In the example shown in FIG. 2, the left end position is obtained as the leftmost position pixel from the reference image #1 among the six pixels including the upper left corner pixels and lower left corner pixels of the images #1, #4, and #7. For example, the position of the upper left corner of the image #7 relative to the reference image #1 is obtained through inversion transformation of affine transformation as in the following equations (2), by using composite parameters A17, B17, C17, and D17 of the images #1 and #7. A point (xL1, yL1) is the coordinates of the upper left corner point (xL7, yL7) of the image #7 as referenced to the reference image #1.

$$xL1 = A17' \cdot xL7 + B17' \cdot yL7 + C17'$$
$$yL1 = -B17' \cdot xL7 + A17' \cdot yL7 + D17' \quad (2)$$

where $A17'=A17/(A17^2+B17^2)$, $B17'=-B17/(A17^2+B17^2)$, $C17'=(-A17 \cdot C17+B17 \cdot D17)/(A17^2+B17^2)$, and $D17'=(-B17 \cdot C17-A17 \cdot D17)/(A17^2+B17^2)$.

Similarly, the right end position is obtained as the rightmost position pixel from the reference image #1 among the six pixels including the upper right corner pixels and lower right corner pixels of the images #6, #3, and #9. The upper end position is obtained as the most upper pixel from the reference image #1 among the six pixels including the upper left corner pixels and upper right corner pixels of the images #4, #5, and #6. The lower end position is obtained as the most lower pixel from the reference image #1 among the six pixels including the lower left corner pixels and lower right corner pixels of the images #7, #8, and #9. If, for example, the position of the lower right corner pixel of the image #9 as referenced to the reference image #1 is to be obtained, the conversions by the equations (2) are executed twice because the direct conversion parameters are not stored in the conversion parameter storage unit 32.

After the rectangular area for the synthesized image is obtained by the above processes, the image conversion synthesization unit 22 obtains each pixel value from the image data of the images #1 to #9. The following processes are performed for each pixel.

Each pixel position (referenced to the reference image #1) for the synthesized image is converted into the pixel position of the images #2 to #9 by using the conversion parameters stored in the conversion parameter storage unit 32. For example, the pixel position of the image #2 is obtained through conversion of the equations (1). The pixel position of the image #3 is obtained by executing similar conversion twice by using the conversion parameters of the images #2 and #3 and the images #1 and #2.

The pixel values of the obtained pixel positions are averaged to obtain a pixel value for the synthesized image. In this case, the pixel values at the pixel position after conversion is in the area outside of the original image area, the pixel values are not averaged. A pixel which is not contained in any of the image areas of the images #1 to #9 is assigned a dummy pixel (e.g., white pixel).

The image data synthesized by the above processes is written in the image data storage unit 30 and displayed on the display screen by the image display unit 10. Image synthesization is not limited only to nine images, but generally N images can be synthesized with simple operations as described above.

Figure 6:
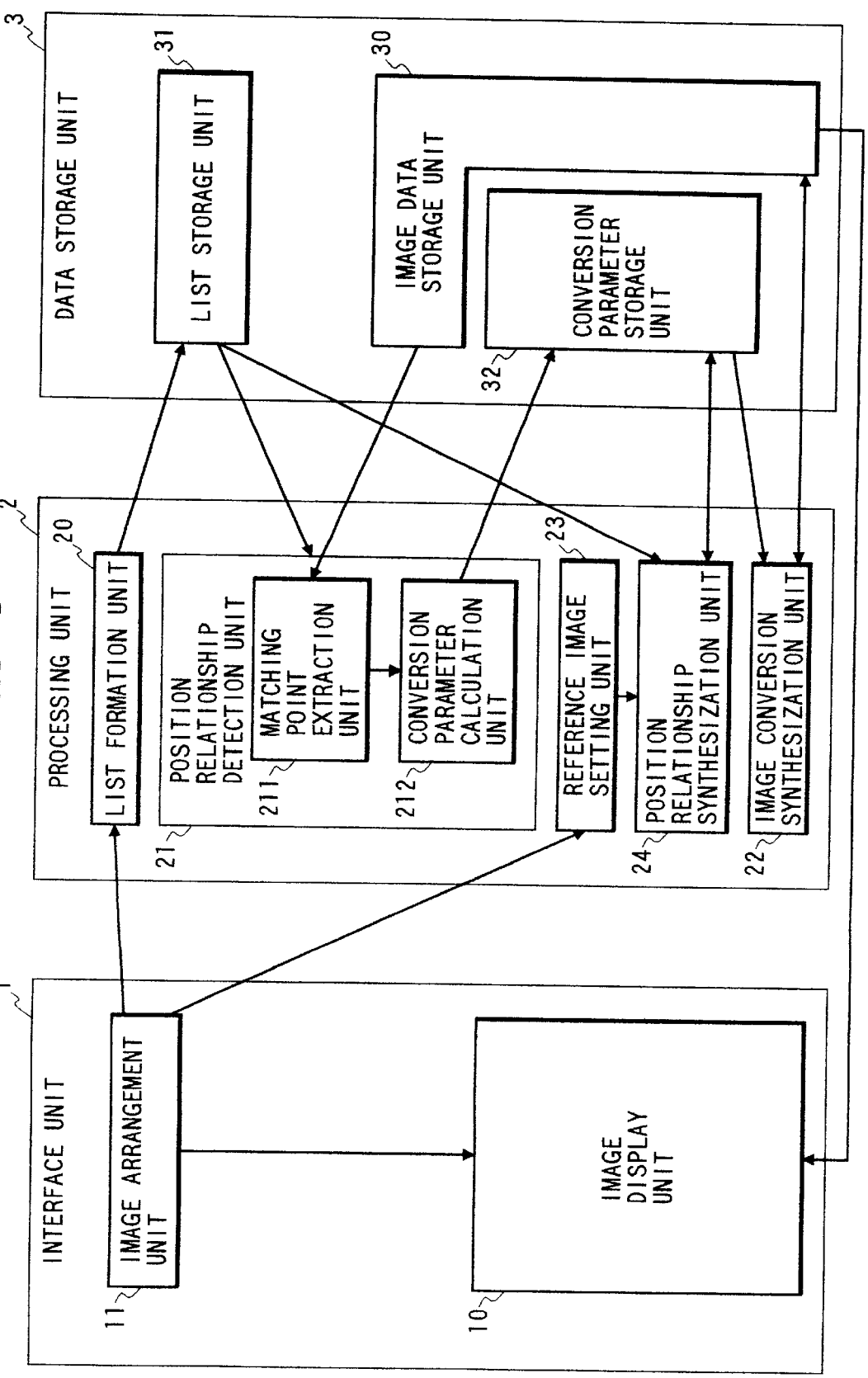
FIG. 6 is a block diagram showing the structure of an image synthesizing apparatus according to a second embodiment of the invention.

FIG. 6 is a block diagram showing the structure of the image synthesizing apparatus of the second embodiment. In FIG. 6, like constituent elements to those of the first embodiment are represented by using identical reference numerals. In the second embodiment, as different from the first embodiment, the processing unit 2 has a reference image setting unit 23 and a position relationship synthesization unit 24.

The reference image setting unit 23 searches an image positioned at a generally central area of the work window in accordance with the arrangement information to thereby set the reference image. The position relationship synthesization unit 24 obtains a position relationship of each image relative to the reference image and synthesizes the position relationships, in accordance with the position relationship of images stored in the conversion parameter storage unit 32. In the following, synthesization of nine images shown in FIG. 2 will be described.

When a user arranges the nine images at the positions shown in FIG. 2, the reference image setting unit 23 obtains first the minimum and maximum values of position data in the horizontal and vertical directions from the arrangement information of each image in the work window, and averages the minimum and maximum values to obtain the median values of the position data in the horizontal and vertical directions. The image having the arrangement information with the shortest distance from the median values is set as the reference image. The image set as the reference image positions at a generally central area of the work window so that the image #2 is set as the reference image.

Figure 7:
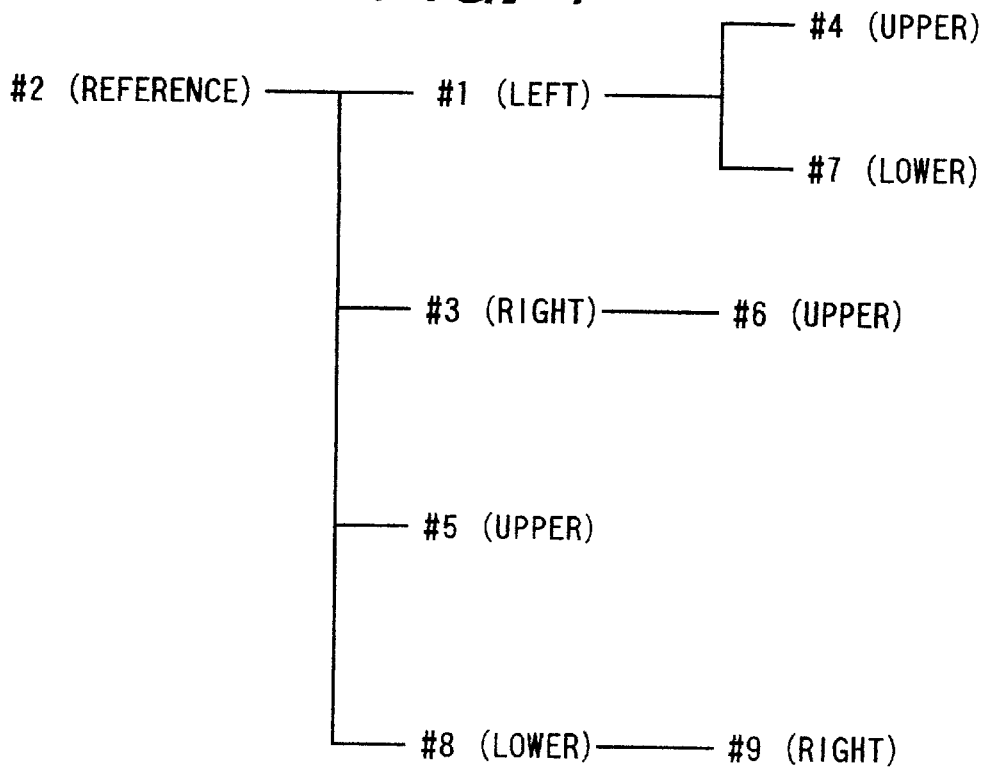
FIG. 7 is an illustrative diagram showing a process list formed in the second embodiment.

The list formation unit 20 performs processes similar to the first embodiment to form the process list. FIG. 7 is an illustrative diagram showing the process list formed by the second embodiment. After the process list is formed, the position relationship detection unit 21 sequentially obtains the position relationships of pairs of two images in accordance with the formed process list.

The position relationship synthesization unit 24 sequentially obtains the position relationships of images relative to the reference image in accordance with the position relationship of images stored in the conversion parameter storage unit 32, and synthesizes the position relationships.

It can be seen from the process list shown in FIG. 7 that the position relationship detection unit 21 has already detected the position relationships of the images #1, #3, #5, #8 relative to the image #2 and the conversion parameters have already been stored in the conversion parameter storage unit 32. The position relationships of the images #4, #7, #6, and #9 are related to the images #1, #1, #3, and #8. It is therefore necessary to synthesize the conversion parameters in order to obtain the position relationships relative to the reference image #2.

In obtaining the position relationship of the image #4 relative to the reference image #2, the position relationship synthesization unit 24 first reads from the conversion parameter storage unit 32 the conversion parameters A21, B21, C21, and D21 representative of the position relationship between the images #2 and #1 and the conversion parameters A14, B14, C14, and D14 representative of the position relationship between the images #1 and #4. The conversion parameters A24, B24, C24, and D24 representative of the position relationship between the images #2 and #4 are obtained by the following equations (3).

$$A24 = A14 \cdot A21 - B14 \cdot B21$$
$$B24 = A14 \cdot B21 + B14 \cdot A21$$
$$C24 = A14 \cdot C21 + B14 \cdot D21 + C14$$
$$D24 = -B14 \cdot C21 + A14 \cdot D21 + D14 \quad (3)$$

The obtained conversion parameters A24, B24, C24, and D24 are overwritten in the conversion parameter storage unit 32 at the storage area for the conversion parameters A14, B14, C14, and D14. Similarly, the position relationships of the images #7, #6, and #9 relative to the reference image #2 are calculated and overwritten in the conversion parameter storage unit 32.

After the position relationships of the images registered in the process list relative to the reference image #2 are synthesized, the image conversion synthesization unit 22 performs an image synthesization process in accordance with the synthesized conversion parameters. First, in accordance with the conversion parameters stored in the conversion parameter storage unit 32 for each image registered in the process list, the image conversion synthesization unit 22 sets an area for the synthesized image as referenced to the reference image #2. After the rectangular area for the synthesized image is determined, the image conversion synthesization unit 22 obtains a pixel value of each pixel of the image data of the images #1 to #9. The conversion of the pixel position of each pixel as referenced to the pixel position of the reference image is completed only by one conversion because the position relationships of the images have already been synthesized by the position relationship synthesization unit 24.

With the image synthesizing apparatus of this embodiment, the image conversion synthesization unit 22 can obtain the pixel position as referenced to the reference image only by one conversion, even for the image area such as image #4 which has no direct right, left, upper, or lower relationship to the reference image #2. Therefore, the conversion efficiency of the pixel position by the image conversion synthesization unit 22 is good.

As compared to the synthesized image by the image synthesizing apparatus of this embodiment, the synthesized image by the image synthesizing apparatus of the first embodiment has the best image quality at the area of the image #1 because the image #1 is used as the reference image and this area is not substantially subjected to the image conversion. In contrast, the synthesized image by the image synthesizing apparatus of this embodiment has the best image quality at the area of the image #2 because the image #2 is used as the reference image and this area is not substantially subjected to the image conversion.

In this embodiment, the reference image is set in accordance with the arrangement information of images set by the user. The reference image may be set in accordance with the position relationship obtained by the position relationship detection unit 21. Furthermore, in this embodiment, the reference image is set so as to make the image quality at the generally central area of the synthesized image be set best. The area of the best image quality may be set by using a cursor and the image in this area is set as the reference image.

The present invention may be applied to a system constituted by a plurality of apparatuses or to a system constituted by a single apparatus. Obviously, the scope of the invention includes a system or apparatus which realize the functions of the invention by using a program supplied thereto. In this case, the effects of the invention can be obtained if the system or apparatus reads a storage medium storing software programs realizing the functions of the invention.

According to the image synthesizing apparatus of the embodiments, three or more images can be efficiently synthesized to form an image with a broad angle of view. Further, three or more images can be synthesized with simple operations to form an image with a broad angle of view. Furthermore, it is possible to efficiently synthesize images and obtain a synthesized image having a good image quality at a desired image area.

Figure 8:
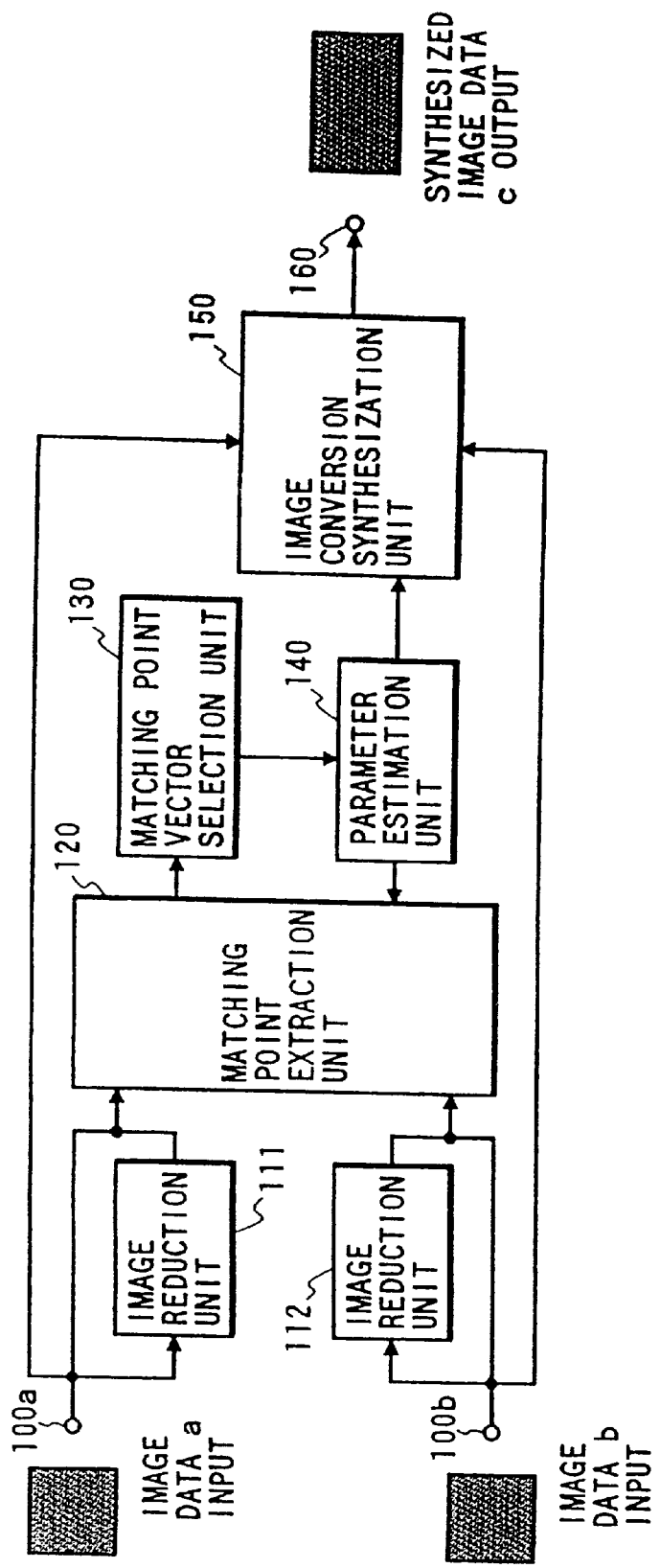
FIG. 8 is a block diagram showing the structure of an image synthesizing apparatus according to a third embodiment of the invention.

FIG. 8 shows the structure of an image synthesizing apparatus according to the third embodiment of the invention.

In FIG. 8, image data a and image data b to be synthesized are applied to input terminals 100a and 100b. The image data a and image data b are obtained by an unrepresented electronic still camera, video camera, or the like and have a partial duplicate image area. For example, the image data a corresponds to an image shown in FIG. 9A, and the image data b corresponds to an image shown in FIG. 9B.

Reference numerals 111 and 112 represent an image reduction unit which reduces the size of the image data a and b, for example, by 1/2, 1/4, and 1/8 and hierarchically generates the reduced image data which is stored in image memories of the image reduction units 111 and 112.

Reference numeral 20 represents a matching point extraction unit which extracts the matching points of the images represented by the image data a and b supplied from the input terminals 100a and 100b or by the reduced image data generated by the image reduction units 111 and 112.

Reference numeral 130 represents a matching point vector selection unit which selects and outputs only the matching point vector having high reliability among matching point vectors of the matching points extracted by the matching point vector extraction unit 120.

Reference numeral 140 represents a parameter estimation unit which estimates coordinate transformation parameters for image coordinate transformation in accordance with the matching point vector selected by the matching point vector selection unit 130.

Reference numeral 150 represents an image conversion synthesization unit which converts the coordinates of the input image data a and b in accordance with the coordinate transformation parameters estimated by the parameter estimation unit 140, and synthesizes the converted image data to output synthesized image data c to an output terminal 160.

The whole of the image synthesizing apparatus is controlled by a control unit not shown.

The operation of the image synthesizing apparatus of the third embodiment will be described wherein the synthesized image data c is formed by the input image data a and b.

In this embodiment, the input image data a and b are each having 512×512 pixels providing a gradation image.

The image reduction units 111 and 112 reduce the size of the image data a and b, for example, by 1/2, 1/4, and 1/8 and generates the reduced image data of 256×256 pixels, 128× 128 pixels, and 64×64 pixels, the reduced image data being represented hereinafter by a2 and b2, a4 and b4, and a8 and b8.

The matching point extraction unit 120 first extracts the matching points of the reduced image data a8 and b8 of the input image data a and b reduced by 1/8, and then sequentially extracts the matching points of the reduced data having a reduction factor of 1/4 and 1/2 and of the equal size of the input image data. In extracting the matching points of the reduced data having a reduction factor of 1/4 and 1/2 and of the equal size of the input image data, estimation at the duplicate area is performed by using the conversion parameters formed by the matching points extracted previously.

The matching point extraction algorithm to be executed by the matching point extraction unit 120 will be described with reference to the flow chart shown in FIG. 10.

Figure 10:
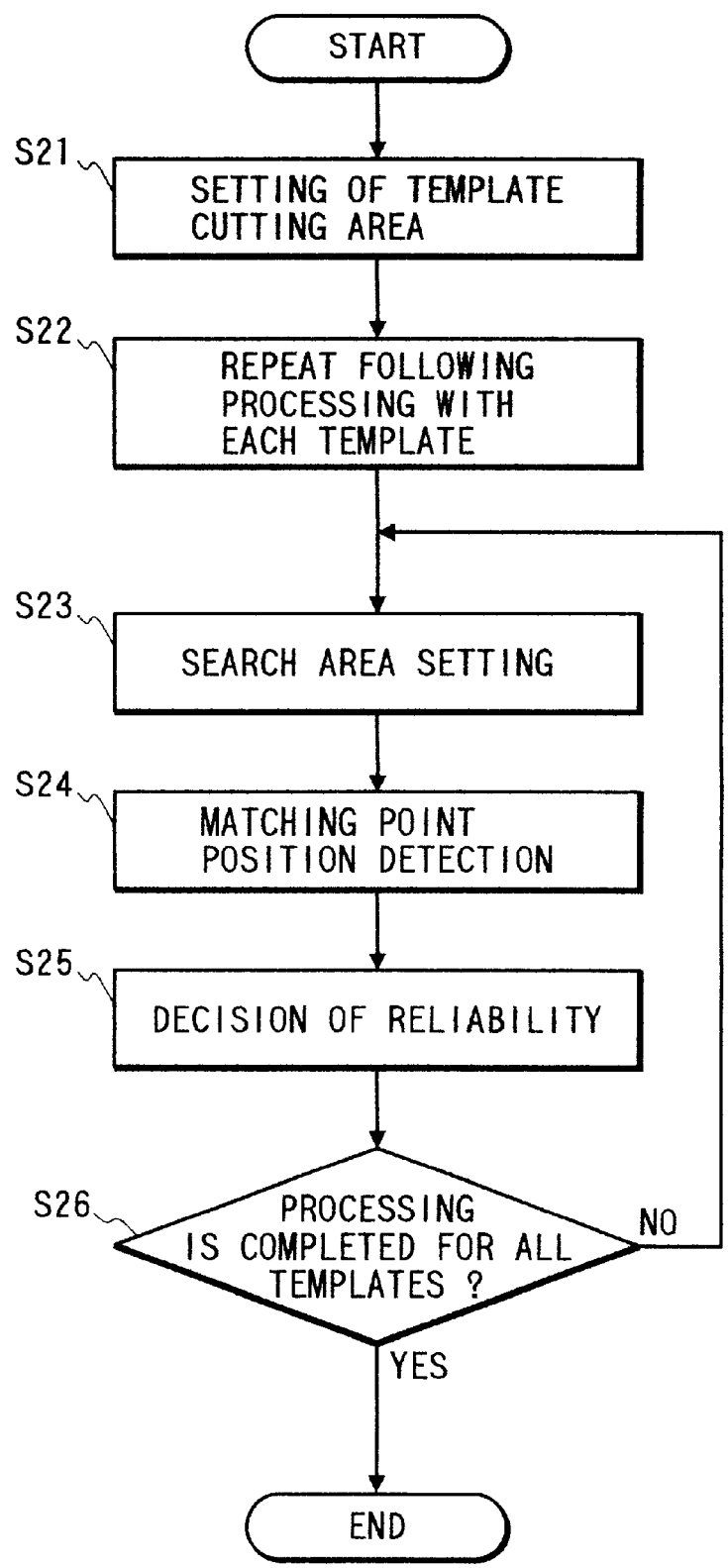
FIG. 10 is a flow chart illustrating a process algorithm to be executed by the matching point extraction unit according to the third embodiment.

Referring to FIG. 10, at step S21 a template cutting area for the reduced data a8 is set. In extracting the matching points of the reduced data a8 and b8, since the two duplicate areas of the two reduced images cannot be known in advance, a predetermined area is set as the template cutting area.

Figure 9A:
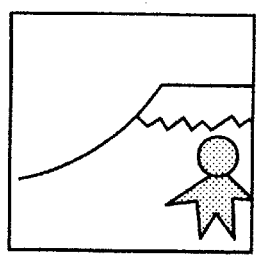
FIGS. 9A and 9B show examples of input images.
Figure 9B:
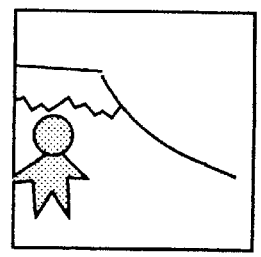
Figure 11:
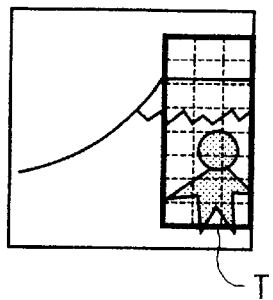
FIG. 11 is a diagram illustrating a method of cutting a template, to be executed by the matching point extraction unit according to the third embodiment.

In this embodiment, assuming that the input images of the input image data a and b are arranged to the left and right as shown in FIGS. 9A and 9B, the template cutting area (an area T in FIG. 11) of the left side reduced image data a8 is determined to be the 30% area of the image on the right side in the horizontal direction and the 10% to 90% area of the image in the vertical direction.

Next, at step S22 of FIG. 10, blocks are cut from the template cutting area set at step S21 of FIG. 10 as templates. Each block has an area about 10% of the original image size as indicated by broken lines in FIG. 11 and has about 7×7 pixels.

If the input images of the input image data a and b are arranged at the upper and lower positions, the template cutting area of the upper side reduced image data a8 is determined to be the 30% area of the image on the lower side in the vertical direction and the 10% to 90% area of the image in the horizontal direction.

The following steps S23 to S25 are executed for all the templates cut at step S22 of FIG. 10. In step S26, it is discriminated whether or not all of the plurality of images have undergone the synthesizing processing. More specifically, in this step, the number of images that have undergone the foregoing steps is counted and the synthesizing processing is ended when the count value is equal to the number of images (for example, nine).

At step S23 of FIG. 10, for each template cut in the above manner, a search area for searching the matching point in the image of the right side reduced image data b8 is set. In extracting the matching points of the reduced image data a8 and b8, the duplicate areas of the two images cannot be known in advance so that a predetermined area is set as the search area for the matching point.

In this embodiment, the search area for the matching point of the right side reduced image data b8 corresponding to each template of the plurality of templates cut for the left side reduced image data a8 is set to the area including the template area and the area shifted about a half area to the right from the right side end of the template in the horizontal direction and the area including the template area and the area about 10% upper and lower than the template area in the vertical direction.

Figure 12:
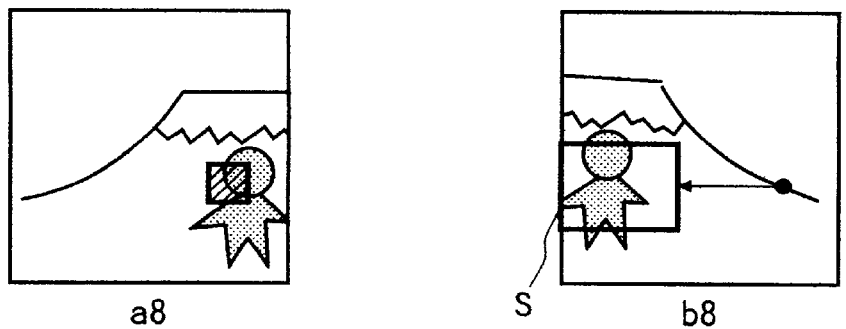
FIG. 12 is a diagram illustrating a method of setting a search area, to be executed by the matching point extraction unit according to the third embodiment.

FIG. 12 shows an example of the search area of the matching point for the right side reduced image data b8. In FIG. 12, the search area of the matching point for the right side reduced image data b8 corresponding to the template of the left side reduced image data a8 indicated by oblique lines is indicated at S.

Setting the search area of the matching point is based on the assumption that the duplicate areas of the image represented by the input image data a and b are not displaced by 50% or more of the input image size in the horizontal direction and by upper and lower 10% areas of the input image size in the vertical direction. If this assumption of the duplicate areas represented by the input image data a and b are not satisfactory, the initial setting for the search area of the matching point is changed.

At step S24 shown in FIG. 10, the image in the search area of the matching point for the right side reduced image data b8 set as above is compared with the image in the template area for the left side reduced image data a8 while sequentially shifting the position of the template. A difference pixel value between pixels constituting the image in the template and the image in the search area is calculated, and the position of the template where the sum of absolute values of the difference values becomes minimum is detected as the matching point.

In this embodiment, the position where the sum of absolute values of differences is minimum is used as the position of the matching point. The matching point position may be the position having the maximum correlation value obtained by correlation calculation between the images in the template and in the search area.

At step S25 shown in FIG. 10, reliability of the matching point detected at step S24 is checked. The reliability check is performed by using the template position where the sum of absolute values of differences is minimum and the template position where the sum of absolute values of differences is second minimum.

Specifically in this embodiment, it is judged that the detected matching point is reliable if the minimum sum of absolute values of differences has a predetermined threshold value or smaller and if the second minimum value of absolute values of differences has another predetermined threshold value or larger. The coordinate data of the matching point extracted from the images of the reduced image data a8 and b8 is stored in an internal memory of the matching point extraction unit 120.

The processes of steps S23 to S25 are executed for each template cut at step S21 until it is detected that the processes are completed for all the templates.

Next, the process to be executed by the matching point vector selection unit 130 will be described.

The matching point vector selection unit 130 first reads coordinate data of each matching point extracted from the images represented by the reduced image data a8 and b8 extracted by the matching point extraction unit 120 and stored in the internal memory, and calculates the matching point vector through calculation of read coordinate data in the horizontal and vertical directions. Histograms of all the calculated matching point vectors are generated both in the horizontal and vertical directions. From the generated histograms of matching point vectors both in the horizontal and vertical directions, only the matching point vectors in the highest occurrence frequency range are selected and output to the next stage parameter estimation unit 140.

As above, the matching point selection unit 130 selects only the matching point vectors in the highest occurrence frequency range. Therefore, even if the matching point extraction unit 120 extracts erroneous matching point vectors, only the matching point vector data with high reliability can be output to the parameter estimation unit 140.

The parameter estimation unit 140 estimates coordinate conversion parameters in accordance with the matching point coordinates of the reduced image data a8 and b8 represented by the matching point vector data supplied from the matching point vector selection unit 130.

Estimation of the coordinate conversion parameters will be later detailed.

The matching point vector data for the size reduced image data a8 and b8 with a reduction factor of 1/8 obtained as above is used for estimating the duplicate areas of two reduced images at the next matching point extraction process for the reduced image data a4 and b4 with a reduction factor of 1/4.

Specifically, the parameter estimation unit 140 calculates average values of the matching point vector data obtained for the reduced image data a8 and b8 both in the horizontal and vertical directions and outputs the average values to the matching point extraction unit 120 for using them at the matching point extraction process of estimating the duplicate areas of two reduced images represented by the reduced image data a4 and b4.

Similarly, the matching point vector data obtained for the reduced image data of the reduced images with the reduction factors of 1/4 and 1/2 is also used for estimating the duplicate areas of two reduced images at the next matching point extraction process.

As the coordinate conversion parameters for the size reduced image data a8 and b8 are output from the parameter estimation unit 140, the matching point extraction unit 120 extracts the matching points of the size reduced image data a4 and b4 of the reduced images with the reduction factor of 1/4.

The matching point extraction algorithm of the matching point extraction unit 120 for extracting the matching points of the reduced image data a4 and b4 of the reduced images with the reduction factor of 1/4 is similar to that illustrated in FIG. 10. However, used for setting the template cutting area at step S21 of FIG. 10 and the search area of the matching point at step S23 are the average values both in the horizontal and vertical directions of the matching point vector coordinate data of the reduced image data a8 and b8 of the reduced images having a reduction factor of 1/8.

Figure 13:
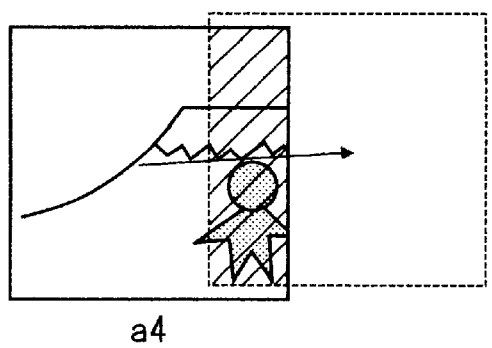
FIG. 13 is a diagram illustrating a method of setting a template cutting area, to be executed by the matching point extraction unit according to the third embodiment.

FIG. 13 is a diagram illustrating a method of setting a template cutting area for the reduced image data a4.

In setting the template cutting area at step S21 of FIG. 10, the duplicate area (indicated by oblique lines in FIG. 13) of the reduced image represented by the reduced image data a4 is estimated from the average value data (indicated by an arrow in FIG. 13) of the matching point coordinate data in the horizontal and vertical directions output from the parameter estimation unit 140, and the left, upper, and lower end positions of the template cutting area for the reduced image data a4 are set in accordance with the estimated duplicate area of the reduced image of the reduced image data a4 to thereby cut the template area.

Figure 14:
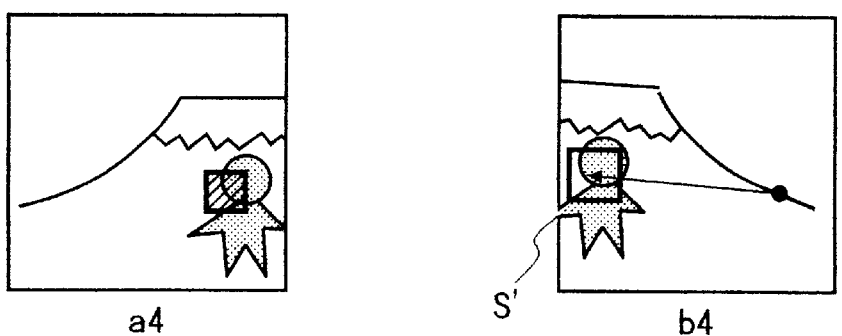
FIG. 14 is a diagram illustrating a method of setting a search area, to be executed by the matching point extraction unit according to the third embodiment.

FIG. 14 is a diagram for illustrating a method of setting a search area of the matching point for the reduced image data b4.

At step S23 in FIG. 10, for each of the plurality of templates cut at step S21, a point (at the front tip of the arrow shown in FIG. 14) is set. This point is shifted from the template position for the image of the reduced image data a4 by the average value of the matching point coordinate data, in both the horizontal and vertical directions, of the reduced image data a8 and b8 supplied from the parameter estimation unit 140. The search area for the matching point is set only to the area (area S' in FIG. 14) having a predetermined width (e.g., five pixels in the upper, lower, right, and left directions) around the set point in the upper, lower, right, and left directions.

The matching point extraction, matching point vector selection, and parameter estimation for the reduced image data a4 and b4 of the reduced image with a reduction factor of 1/4 are performed in the manner similar to that of the reduced image data a8 and b8 of the reduced image with a reduction factor of 1/8.

The matching point extraction process for the reduced image data with a reduction factor 1/2 and that for the image data with an equal size are performed in the manner similar to that of the reduced image data of the reduced image with a reduction factor of 1/4. The matching point extraction, matching point vector selection, and parameter estimation for the reduced image data a2 and b2 of the reduced image with a reduction factor of 1/2 are sequentially performed, and the matching point extraction, matching point vector selection, and parameter estimation for the equal-size image data a and b are sequentially performed, both in a hierarchical manner.

In the above processes, for the equal-size image data a and b, coordinate conversion by affine transformation is performed at the image conversion synthesization post-process. Therefore, the matching point coordinate vectors in the horizontal and vertical directions are not necessarily in the predetermined range so that selection of the matching point vector by the histograms is not necessary.

The parameter estimation process will be detailed.

After the coordinate conversion parameters of the two images of the image data a and b are obtained in the above manner, the image conversion synthesization unit 150 lastly converts the coordinates of the input image data a and b by using the coordinate conversion parameters estimated by the parameter estimation unit 140 and synthesizes the two images into one image.

This coordinate conversion is affine transformation. In estimating the coordinate conversion parameters from the matching point vector of the equal-size image of the input image data a and b, the parameter estimation unit 140 outputs not the average value of matching point vector data but affine transformation parameters in the following manner.

Assuming that the input image data b has a position relationship, relative to the input image data a, of $\theta$ rotation, (dx, dy) parallel motion, and m magnification, a point (xa, ya) in the input image data a corresponds to a point (xb, yb) in the input image data b indicated in the following equations (4).

$$xb = (\cos\theta \cdot xa + \sin\theta \cdot ya - dx) \times m \quad (4)$$
$$= A \cdot xa + B \cdot ya + C$$
$$yb = (-\sin\theta \cdot xa + \cos\theta \cdot ya - dy) \times m$$
$$= -B \cdot xa + A \cdot ya + D$$

where A=m·cos $\theta$, B=m·sin $\theta$, C=−m·dx, and D=−m·dy.

The parameters A, B, C, and D are estimated by a least square method.

In order for the parameter estimation unit 140 to estimate the parameters, at least two pairs of matching point coordinates. If only one pair of matching point coordinates is obtained, the average value of matching point vectors of the reduced image data of the reduced image with a reduction factor of 1/2 is set as the parallel motion parameter. Namely, assuming that the average value of matching point vectors of the reduced image data of the reduced image with a reduction factor of 1/2 is (ax, ay), then the parameters indicated by the following equations (5) are used as the parallel motion parameters.

$$A=1, B=0, C=-ax, D=-ay \quad (5)$$

If no pair of matching point coordinates is obtained, the succeeding process can not be executed. Therefore, a message to this effect is displayed on the display screen to notify the operator and the synthesization process is terminated.

In this embodiment, the parameter estimation unit 140 estimates affine transformation parameters for the equal size input image, and parallel motion parameters for the reduced images. Affine transformation parameters may be estimated for both the equal-size image and reduced images.

Figure 15:
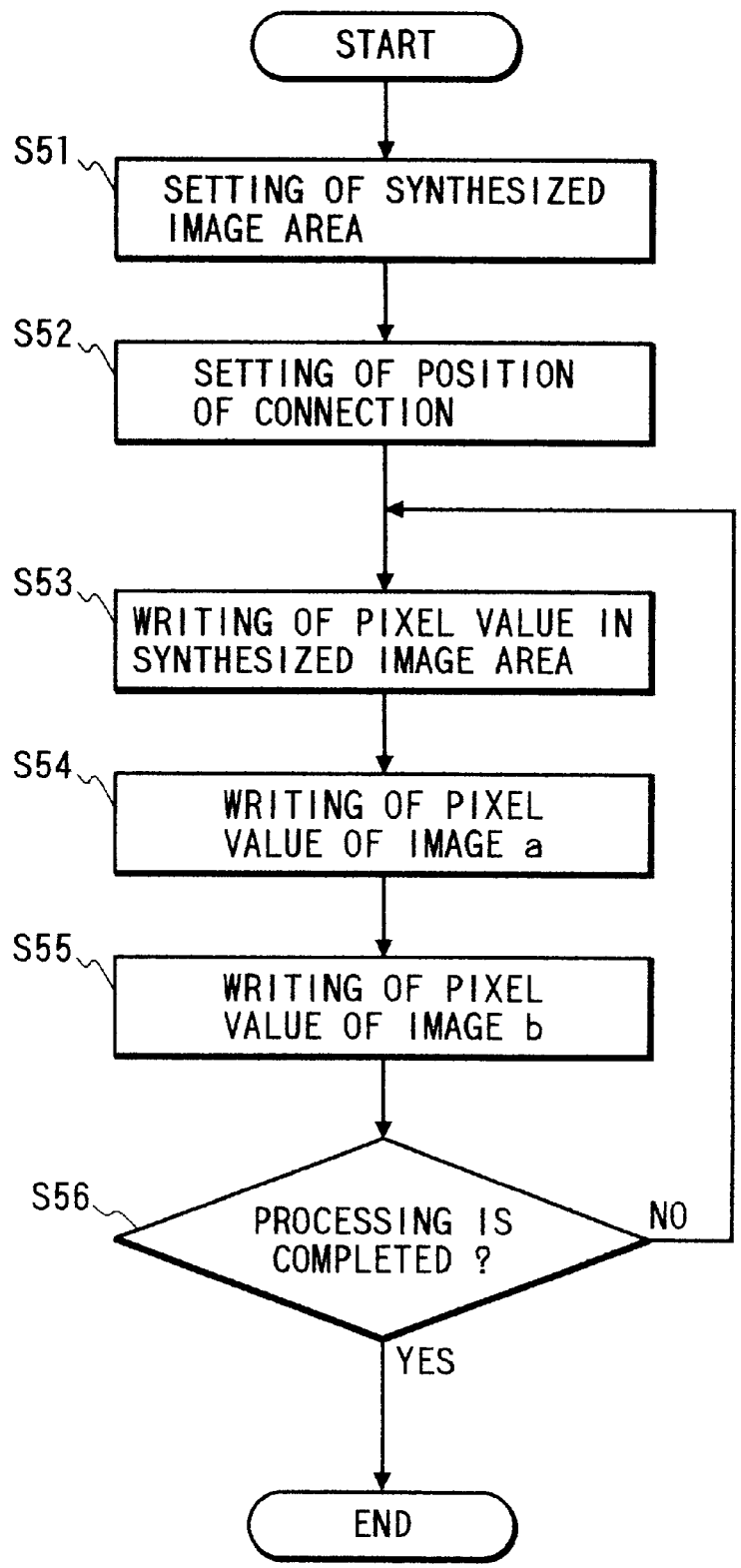
FIG. 15 is a flow chart illustrating a process algorithm to be executed by an image conversion synthesization unit according to the third embodiment.

The image conversion synthesization unit 150 forms synthesized image data c in accordance with the algorithm shown in FIG. 15.

At step S51 of FIG. 15, first an image area for the synthesized image of the synthesized image data c is set.

In this embodiment, the image area indicated by a broken line in FIG. 16 is set using the coordinate system of the image of the input image data a as a reference. Namely, the left end of the image area corresponds to the leftmost coordinate value of the image of the image data a, and the right end corresponds to a larger coordinate value among coordinate values of the upper right and lower right corners of the image of the image data b as referenced to the coordinate system of the image data a. In order to convert the coordinates of the image of the image data b into the coordinates of the image of the image data a, inverse transformation of the affine transformation of the equations (4) is used. Namely, assuming the inverse transformation parameters are A', B', C', and D', transformation indicated by the following equations (6) is performed.

$$xa = A' \cdot xb + B' \cdot yb + C'$$
$$ya = -B' \cdot xb + A' \cdot yb + D' \quad (6)$$

where $A' = A/(A^2+B^2)$, $B' = -B/(A^2+B^2)$ $C' = (-A \cdot C + B \cdot D)/(A^2+B^2)$, and $D' = (-B \cdot C - A \cdot D)/(A^2+B^2)$.

The upper end of the synthesized image of the synthesized image data c corresponds to a coordinate value of the upper end of the image of the image data a and a smaller coordinate value among coordinate values of the upper right and upper left corners of the image of the image data b as referenced to the coordinate system of the image data a. The lower end of the synthesized image of the synthesized image data c corresponds to a coordinate value of the lower end of the image of the image data a and a larger coordinate value among coordinate values of the lower right and lower left corners of the image of the image data b as referenced to the coordinate system of the image data a.

Next, at step S52 of FIG. 15, a connection position is set to the center of the duplicate areas as indicated by a dotted line in FIG. 16. The connection position is indicated by an average of the right end coordinate value of the image of the image data a and a smaller coordinate value among the coordinate values of the upper left and lower left corners of the image of the image data b as referenced to the coordinate system of the image data a.

At step S53 of FIG. 15, pixel values in the image area of the synthesized image data c set at step S51 are obtained and written in a memory area.

At step S54 of FIG. 15, for the image area of the image data a in the image area of the synthesized image data c, the pixel values of the image data a themselves are written in a memory area corresponding to the image data a in the memory area corresponding to the image area of the synthesized image data c.

At step S55 of FIG. 15, for the image area of the coordinate converted image data b in the image area of the synthesized image data c, the pixel values of the coordinate converted image data b themselves are written in a memory area corresponding to the coordinate converted image data b in the memory area corresponding to the image area of the synthesized image data c. In this case, if the pixel values of the image data a have already been written, only the pixels to the right of the connection position are written. Step S56 is similar to S26.

The synthesized image of the synthesized image data c obtained in the above manner is shown in FIG. 17. An area indicated by oblique lines in FIG. 17 is not assigned with any pixel by the images of the image data a and b. Therefore, this area may be assigned dummy pixels, for example, white pixels.

In this embodiment, the image conversion synthesization unit 150 assigns the duplicate area with either the image data a or the coordinate converted image data b. An average value of the image data a and coordinate converted image data b may be assigned or an average value of the image data a and coordinate converted image data b whose pixel values are weighted, for example, in the horizontal direction, may be assigned.

The synthesized image data c generated by the image conversion synthesization unit 150 is supplied to a display, a printer, or the like.

In this embodiment, image data of two gradation images is synthesized. The invention is applicable to synthesization of image data of two color images. In this case, for example, in extracting matching points of two images, only image of G components may be used among the color image components of R (red), G (green), and B (blue), or an image formed by average values of R, G, and B may be used.

In this embodiment, image data of two images taken with an electronic still camera, a video camera, or the like is synthesized. Obviously, the invention is applicable to synthesization of computer graphics image data.

As described above, according to the image synthesizing apparatus of this embodiment, a plurality of images can be precisely synthesized without cumbersome operations such as designating a matching point in a plurality of images with a pointer or the like.

In the image synthesizing apparatus of this embodiment, the template cutting area, from which small area templates are cut to obtain a matching point in each image of a plurality of images, is designated in a limited area. Therefore, erroneous matching point extraction (by identifying a non-existent matching point in an area other than the duplicate areas of a plurality of images is avoided and a synthesized image can be formed precisely.

In the image synthesizing apparatus of this embodiment, the search area, for searching a matching point in each image corresponding to the template cutting area from which small area templates are cut to obtain the matching point in each image of a plurality of images, is designated in a limited area with reference to the information supplied with the parameter estimation unit. Therefore, a plurality of images can be synthesized in a short process time. Even if a plurality of images contains a number of analogous parts, the matching point can be precisely extracted. A plurality of images can therefore be synthesized precisely.

In the image synthesizing apparatus of this embodiment, the search area, for searching a matching point in each image corresponding to the template cutting area from which small area templates are cut to obtain the matching point in each image of a plurality of images, is designated in a limited area with reference to the extraction results of the matching point of a reduced image. Therefore, a plurality of images can be synthesized in a short process time. Even if a plurality of images contains a number of analogous parts, the matching point can be precisely extracted. A plurality of images can therefore be synthesized precisely.

In the image synthesizing apparatus of this embodiment, many matching points are extracted near at the connection position of image synthesization. Therefore, a shift of the connection position of the synthesized image can be reduced.

Figure 18:
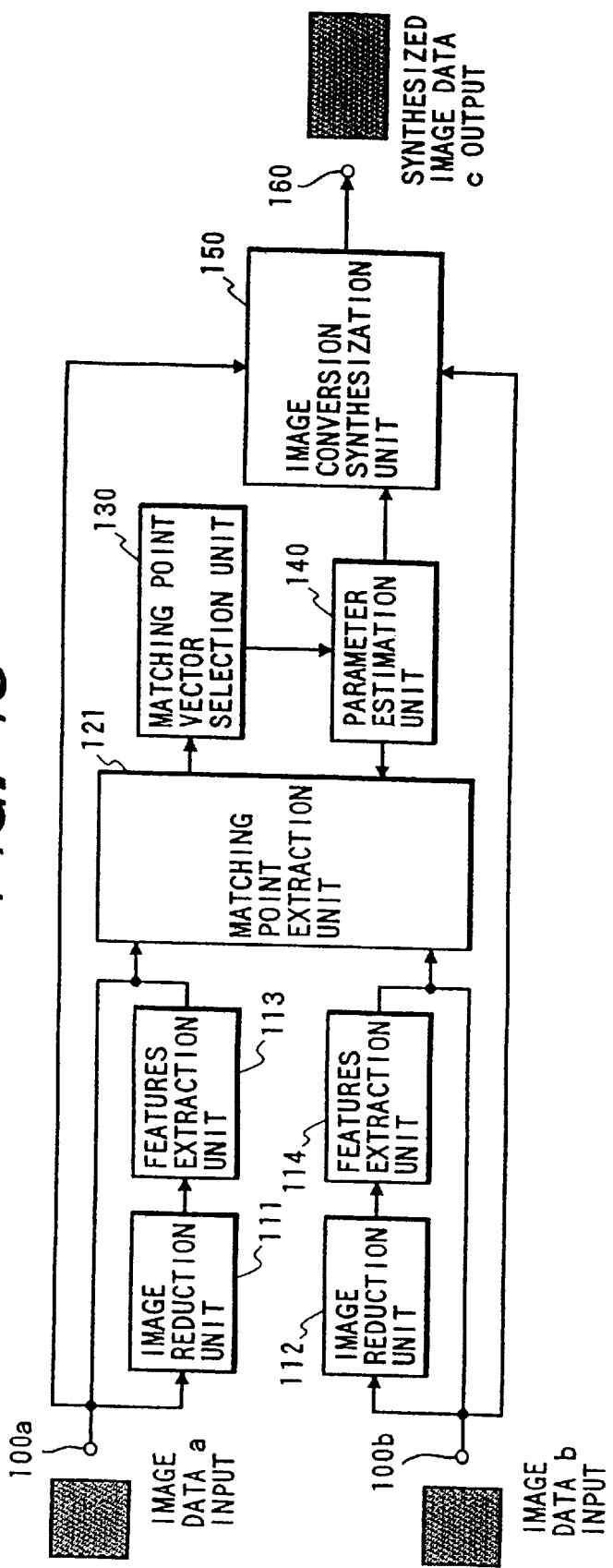
FIG. 18 is a block diagram showing the structure of an image synthesizing apparatus according to a fourth embodiment of the invention.

FIG. 18 shows the structure of an image synthesizing apparatus of the fourth embodiment of the invention. In FIG. 18, like elements having functions similar to those of the third embodiment shown in FIG. 8 are represented by using identical reference numerals and the detailed description thereof is omitted.

In FIG. 18, reference numerals 113 and 114 represent a feature extraction unit which emphasizes the edge portion of a reduced image of the reduced image data output from the image reduction unit 111, 112 to thereby generate feature image data which is stored in an image memory of the feature extraction unit 113, 114. The feature image data is represented hereinafter by a2', b2', a4', b4', a8', and b8'.

In the image synthesizing apparatus of the fourth embodiment, an image memory is provided not in the image reduction units 111 and 112, but in the next stage feature extraction units 113 and 114. The generated feature image data is stored in this memory. In this embodiment, in order to generate the feature image data, the reduced image data is subjected to convolution operation by a 3×3 pixel two-dimensional filter shown in FIGS. 9A and 9B to emphasize the edge portion of the reduced image of the reduced image data.

Reference numeral 121 represents a matching point extraction unit which extracts the matching points of the images represented by the image data a and b supplied from the input terminals 100a and 100b or by the feature image data generated by the feature extraction units 113 and 114.

The feature extraction unit 121 extracts matching points of the feature image data a8' and b8' of the feature images having a size of 1/8 the images of the input image data a and b, and then extracts the matching points of the feature image data having a reduction factor of 1/4, 1/2, an equal size, and the like. In extracting the matching points of the feature image data having a reduction factor of 1/4, 1/2, an equal size, and the like, estimation at the duplicate area is performed by using the conversion parameters formed by the matching points extracted previously.

The matching point extraction algorithm to be executed by the matching point extraction unit 121 will be described with reference to the flow chart shown in FIG. 20.

Figure 20:
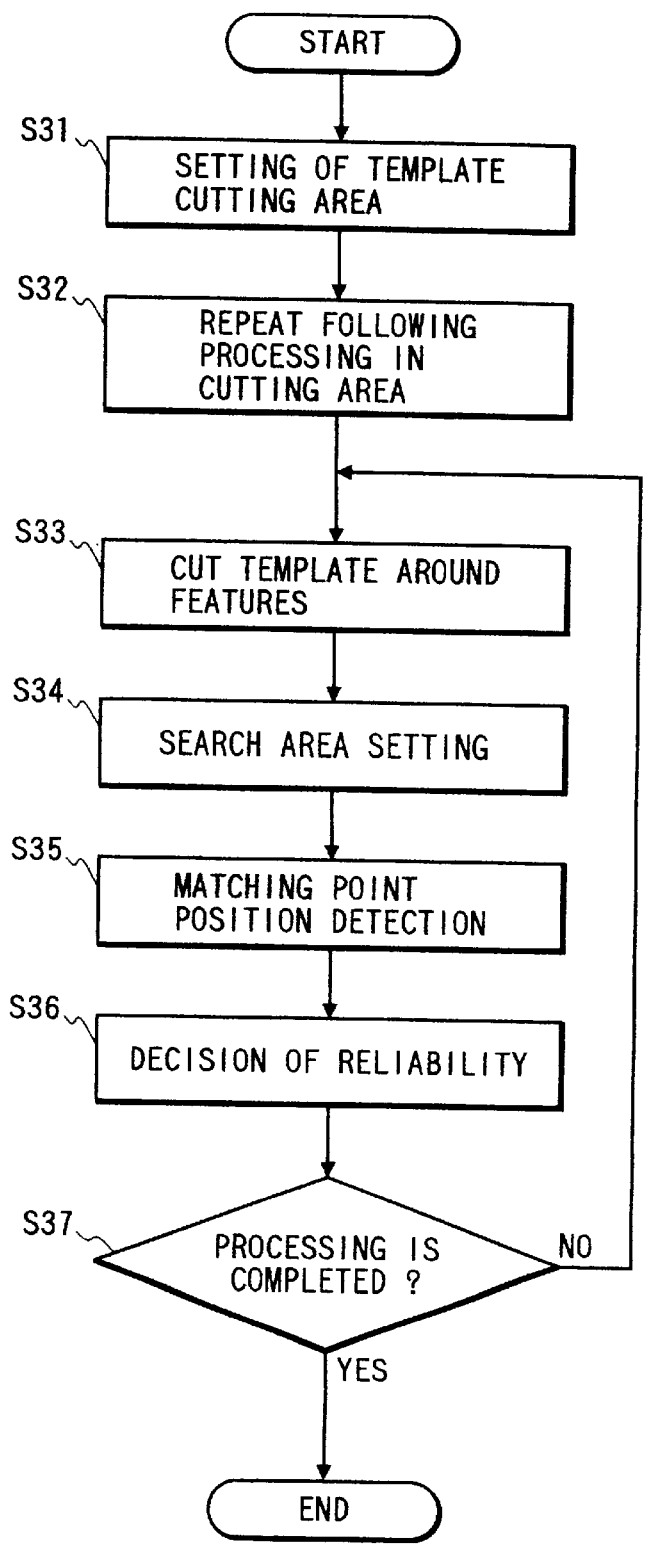
FIG. 20 is a flow chart illustrating a process algorithm to be executed by the matching point extraction unit according to the fourth embodiment.

Referring to FIG. 20, at step S31 a template cutting area for the feature image data a8' is set. In extracting the matching points of the feature image data a8' and b8', since the duplicate areas of the two feature images cannot be known in advance, a predetermined area is set as the template cutting area similar to the third embodiment.

The following steps S33 to S36 are executed for all the templates cut at step S33 of FIG. 20 (step S37 is similar to S26).

At step S33, templates are cut around the features.

Specifically, in extracting the matching point of the feature image data a8' with a reduction factor of 1/8, as shown in FIG. 21, the template cutting area set at step S31 is divided into the upper and lower areas T1 and T2. The matching points in the areas T1 and T2 are extracted at steps S33 to S36 along arrows shown in FIG. 20, i.e., from the right end of the feature image data a8' until a predetermined number of matching points are extracted.

Extraction of the matching point is judged by whether the pixel value of the feature image of the feature image data a8' is a predetermined threshold value or larger. If it is a predetermined threshold value or larger, it is judged as the feature image and the matching point is extracted at steps S34 to S36 of FIG. 20. If the pixel value is not the predetermined threshold value or larger, it is judged the image is not the feature image and the matching point is not extracted at steps S34 to S36 of FIG. 20, and the feature image process for the next image size is performed.

In this embodiment, the process continues until the predetermined number of matching points are extracted and then the process is terminated. Therefore, unnecessary process time can be saved and the process time can be shortened. Since the process is performed from the right end of the feature image data a8', many matching points can be extracted near the connection position of two images, for example, even if the process is terminated sooner than would conventionally happen. Therefore, a shift of the connection position of two images can be reduced. Since the template cutting area is divided into the upper and lower areas, the connection position can be balanced between the two images.

Similar processes are performed for extracting the matching point of the feature image data having a reduction size of 1/4 and 1/2. In extracting the matching point of the feature image data of an equal size, the next stage image conversion synthesization unit 150 sets the connection position of two images as shown in FIG. 16 similar to the third embodiment. Therefore, the matching point is extracted near at the connection position. The connection position of two images is calculated in the manner similar to step S52 of FIG. 15 to be executed by the image conversion synthesization unit 150 of the third embodiment.

After the connection position of two images is calculated, the template cut area set at step S31 is divided into right and left areas T3 and T4 at the boundary of the connection position as shown in FIG. 22. The process is executed along arrows shown in FIG. 22, i.e., starting at the position near the connection position (L' in FIG. 22) of the feature image data a.

The template cutting area is set in the similar manner for extracting the matching point of the feature image data a2' and a4' having a reduction factor of 1/4 and 1/2. For extracting the matching point of the equal-size feature image data a, the convolution operation is performed by using a 3×3 pixel two-dimensional filter shown in FIG. 19 and thereafter the matching point is extracted through a threshold process to cut templates around the feature, because the process by the feature extraction units 113 and 114 is not performed for the equal-size image data a.

Next, at step S34 of FIG. 20, a search area for the right side image data b is set for searching the matching point for the template cut at step S33. The duplicate areas are not known in advance for the feature image a8' and b8' having a reduction factor of 1/8. Therefore, similar to the third embodiment, a predetermined area is set as the search area. For the feature data of the feature images having a reduction factor of 1/4, 1/2, and the equal size, and the like, the search area is set by using coordinate conversion parameters output from the parameter estimation unit 140 similar to the third embodiment.

At step S35 of FIG. 20, the image in the search area for searching the matching point of the right side feature image data b8' is compared with the image in the template for the left side feature data a8', while sequentially shifting the template in parallel. A difference value between pixel values of the image in the template and the image in the search area. The position of the template where the sum of absolute values of the difference values is minimum, is used as the matching point.

At step S36 of FIG. 20, reliability of the matching point detected at step S35 is checked. Coordinate data of the extracted matching point is stored in the internal memory of the matching point extraction unit 121.

In this embodiment, the matching point of the reduced image is extracted from the feature image. Therefore, even if there is some luminance difference between input images, the matching point can be extracted without being affected by the luminance difference. Since the matching point is extracted from the input image itself without using the feature image, the matching point can be extracted without emphasizing image noises.

The other operations of the image synthesizing apparatus of the fourth embodiment are similar to the third embodiment, and so the description thereof is omitted.

Figure 23:
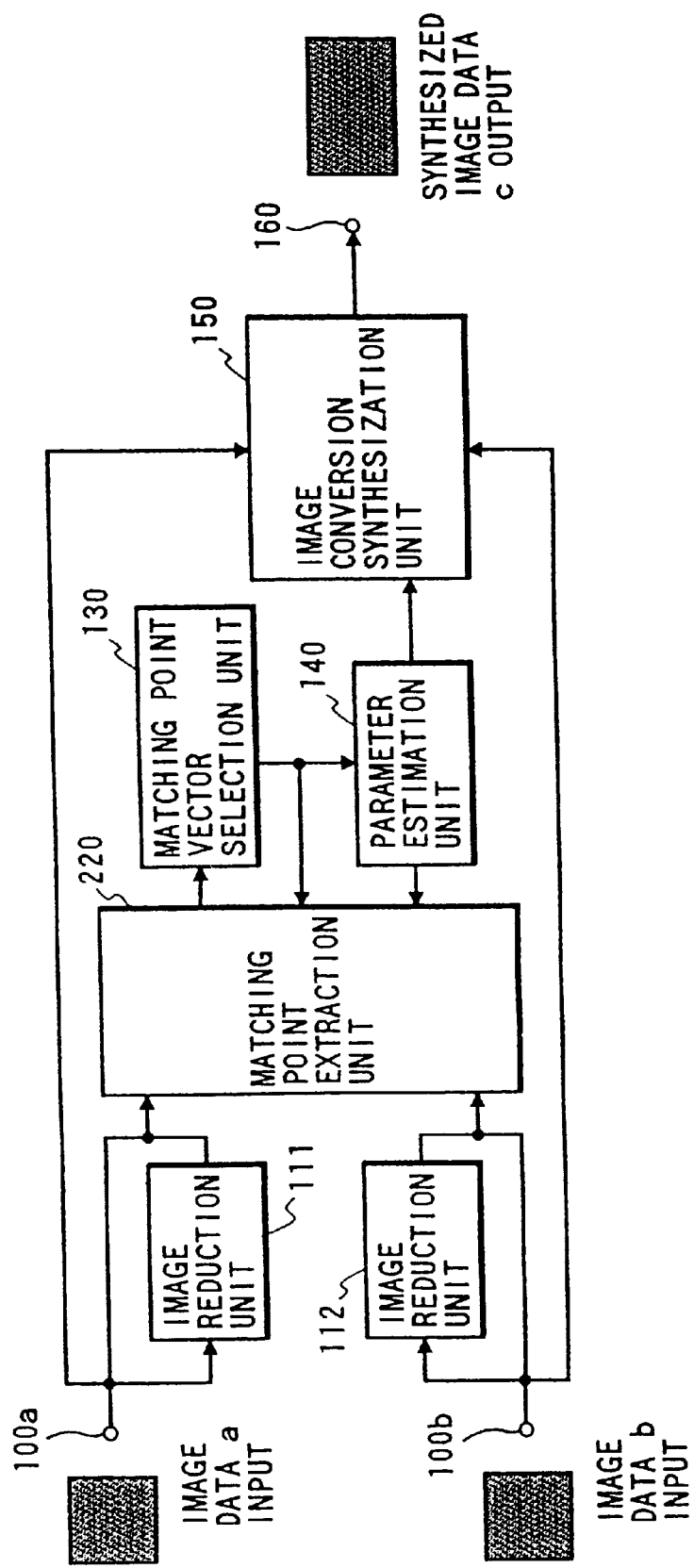
FIG. 23 is a block diagram showing the structure of an image synthesizing apparatus according to a fifth embodiment of the invention.

FIG. 23 shows the structure of an image synthesizing apparatus according to the fifth embodiment of the invention. In FIG. 23, like elements having functions similar to those of the third embodiment shown in FIG. 8 are represented by using identical reference numerals and the detailed description thereof is omitted.

In this embodiment, the matching point extraction unit 220 extracts the matching point by using the matching point coordinate data output from the matching point vector selection unit 130.

In this embodiment, the matching point extraction algorithm to be executed by the matching point extraction unit 220 is similar to the third embodiment shown in FIG. 10. The matching point extraction algorithm to be executed by the matching point extraction unit 22 will be described with reference to the flow chart shown in FIG. 10.

At step S21 shown in FIG. 10, a template cutting area for the feature image data a8 is set. The following steps S23 to S25 are executed for all the templates cut at step S22. The matching points of the reduced images having a reduction factor of 1/4, 1/2, 1/1 and the like are extracted by using only the templates which can extract the matching points of the size reduced image data of reduced images having a reduction size of 1/8, 1/4, 1/2 and the like.

At step S23 of FIG. 10, for each of the templates cut in the above manner, a search area for the right side image data b8 is set for searching the matching point. The duplicate areas are not known in advance for the reduced image data a8 and b8. Therefore, similar to the third embodiment, a predetermined area is set as the search area. In extracting the matching point of the size reduced image data having a reduction factor of 1/4, 1/2, the equal size, the search area is set by using matching point coordinate data output from the matching point vector selection unit 30, this search area being an area having a predetermined with (e.g., +/−5 pixels) in the upper, lower, right, and left directions around the matching point coordinate value.

At step S24 of FIG. 10, the image in the search area for searching the matching point of the right side feature image data b8 is compared with the image in the template for the left side feature data a8, while sequentially shifting the template. A difference value of pixel values between the image in the template and the image in the search area is calculated. The position of the template where the sum of absolute values of the difference values is minimum, is used as the matching point.

At step S25 of FIG. 10, reliability of the matching point detected at step S24 is checked. Coordinate data of the extracted matching point is stored in the internal memory of the matching point extraction unit 121.

The other operations of the image synthesizing apparatus of the fifth embodiment are similar to the third embodiment, and so the description thereof is omitted.

As described above, in the image synthesizing apparatus of this embodiment, the search area, for searching a matching point in each image corresponding to the template cutting area from which small area templates are cut to obtain the matching point in each image of a plurality of images, is designated in a limited area with reference to the information output from the matching point vector selection unit. Therefore, a plurality of images can be synthesized in a short process time. Even if a plurality of images contains a number of analogous parts, the matching point can be precisely extracted. A plurality of images can therefore be synthesized precisely.

As described above, according to the image synthesizing apparatus of this embodiment, even if there is some brightness difference between input images, the matching point can be extracted in a short process time without cumbersome operations. A plurality of images can be automatically and precisely synthesized with a small shift of the connection position between images.

Many widely different embodiments of the present invention may be constructed without departing from the spirit and scope of the present invention. It should be understood that the present invention is not limited to the specific embodiments described in the specification except as defined in the appended claims.

What is claimed is:

1. An image synthesizing method for synthesizing a plurality of images, comprising the steps of:
    (a) inputting the plurality of images;
    (b) detecting those ones of the images which at least partially overlap with another selected image;
    (c) detecting those ones of the images which at least partially overlap with at least of said detection images, and which have not already been detected or selected;
    (d) detecting position relationships between a predetermined reference image and those ones of images which have been detected or selected in said steps (b) and (c); and
    (e) collectively syntheszing all of the images on the basis of the position relationships detected in said step (d).

2. An image synthesizing method according to claim 1, wherein said synthesizing step obtains image data of an image in a synthesized image area from the input images in accordance with the position relationship between the predetermined reference image and an image which has been detected in said steps (b) and (c).

3. An image synthesizing method for synthesizing a plurality of images, comprising the steps of:
    (a) inputting the plurality of images;
    (b) generating a process list by detecting those ones of the images which at least partially overlap with another, selected one of the images, and, for at least one of the detected images, by detecting those one of the images which at least partially overlap with said detected images, and which have not already been detected or selected;
    (c) detecting position relationship betwen a predetermined reference image and those ones of images which have been detected or selected in said step (b);
    (d) determining conversion parameters based on the position relationships detected in said step (c); and
    (e) synthesizing all of the images on the basis of the conversion parameters determined in said step (d).

4. An image synthesizing method for synthesizing a plurality of images, comprising the steps of:
    producing reduced versions of the plurality of images;
    applying the reduced versions of the plurality of images to at least a first input of an extractor which extracts similar points in the reduced versions of the plurality of images and predicts duplicated portions of the plurality of images based on information applied to a second input of the extractor;

generating coordinate conversion parameters based on the similar points extracted by the extractor, and applying information representing the coordinate conversion parameters to the second input of the extractor; and synthesizing the plurality of images baBed on the information representing the coordinate conversion parameters generated in the generating step.

5. A method according to claim 3, wherein the selected image is disposed substantially at a center of the plurality of images.

6. An image synthesizing method for synthesizing a plurality of images, comprising the steps of:

(a) inputting the plurality of images;

(b) generating a process list by detecting those ones of the images which at least partially overlap with another, selected one of the images, and, for at least one of the detected images, by detecting those one of the images which at least partially overlap with said detected image, and which have not already been detected or selected;

(c) detecting position relationships between said images which have been detected or selected in said step (b);

(d) determining conversion parameters based on the position relationships detected in said step (c);

(e) selecting a reference image;

(f) converting said conversion parameters determined in said step (d) with respect to the reference image selected in said step (e); and (g) synthesizing all of the images on the basis of the conversion parameters converted in said step (f).

7. An image synthesizer for synthesizing a plurality of images, comprising:

means for imputting the plurality of images;

means for detecting those ones of the image which at least partially overlap with a selected one of the images, and, for at least one of the detected images, detecting those ones of the images which at least partially overlap with that at least one detected image, and which have not already been detected or selected;

means for detecting position relationships between each selected image and those ones of images which have been detected as being at least partially overlapping with the selected image; and means for collectively synthesizing all of the images on the basis of the detected position relationships.

8. An image synthesizer according to claim 7, wherein said means for collectively synthesizing obtains image data of an image in a synthesized image area from the input images in accordance with the position relationship between each selected image and an image which has been detected as bein at least partially overlapping with that selected image.

9. A image synthesizer for synthesizing a plurality of images, comprising:

means for inputting the plurality of images;

menas for generating a process list by detecting those ones of the images which at least partially overlap with a selected one of the images, and, for at least one of the detected images, by detecting those one of the images which at least partially overlap with that at least one detected image, and which have not already been detected or selected;

menas for detecting position relationships between each selected image and those one of images which have been detected as being at least partially overlapping with that selected image;

means for determining conversion parameters base on the position relationships detected; and means for synthesizing all of the images on the basis of the determined conversion parameters.

10. A method according to claim 9, wherein the selected image is disposed substantially at a center of the plurality of images.

11. An image synthesizer for synthesizing a plurality of images, comprising:

means for producing reduced versions of the plurality of images;

means for applying the reduced version of the plurality of images to at least a first input of an extractor which extracts similar points in the reduced versions of the plurality of images and predicts duplicated portions of the plurality of images based on information applied to a second input of the extractor;

means for generating coordinate conversion parameters based on the similar points extracted by the extractor, and applying information representing the coordinate conversion paramters to the second input of the extractor; and means for synthesizing the plurality of images based on the information representing the generated coordinate conversion parameters.

12. An image synthesizer for synthesizing a plurality of images, comprising:

means for inputting the plurality of images;

means for generating a process list by detecting those ones of the images which at least partially overlap with another, selected one of the images, and, for at least one of the detected images, by detecting those one of the images which at least partially overlap with that at least one detected image, and which have not already been detected or selected;

means for detecting position relationships between each selected image and those one of images which have been detected as being at least partially overlapping with that selected image;

means for determining conversion parameters based on the detected position relationships;

means for synthesizing all of the images on the basis of the determined conversion parameters;

means for selecting a reference image; and means for converting at least one of the parameters with respect to the selected reference image.

13. An image synthesizing apparatus for synthesizing a plurality of images, comprising:

an input unit for inputting the plurality of images;

a first detection unit for detecting those ones of the images which at least partially overlap with another selected image;

a second detection unit for detecting those ones of the images which at least partially overlap with at least one of said detected images detected by first detection unit, and which have not already been detected or selected;

a position relationship detection unit for detecting position relationships between a predetermined reference image and those ones of images which have been detected or selected by said first and second detection unit; and a synthesizing unit for collectively synthesizing all of the images on the basis of the position relationships detected by said position relationship detected unit.

14. An apparatus according to claim 13, wherein said synthesizing unit obtains image data of an image in a synthesized image area from the input images in according with the position relationship between the predetermined reference image and an image which has been detected by said first and second detection unit.

15. An image synthesizing apparatus for synthesizing a plurality of images, comprising:

an input unit for inputting the plurality of images;

a generating unit for generating a process list by detecting those ones of the images which at least partially overlap with another selected image, and, for at least one of the detected images, by detecting those ones of the images which at least parially overlap with said detected images, and which have not already been detected or selected;

a detecting unit for detecting position relationships between a predetermined reference image and those ones of images which have been detected or selected by said generating unit;

a determining unit for determining conversion parameters base on the position relationships detected by said detecting unit; and a synthesizing unit for synthesizing all of the images on the basis of the conversion parameters determined by said determining unit.

16. An apparatus according to claim 15, wherein the selected image is disposed substantially at a center of the plurality of images.

17. An image synthesizing apparatus for synthesizing a plurality of images, comprising:

a producing unit for producing reduced versions of the plurality of images;

an applying unit for applying the reduced versions of the plurality of images to at least a first input of an extractor which extracts similar points in the reduced version of the plurality of images and predicts duplicated portions of the plurality of images based on information applied ot a second input of the extractor;

a generating unit for generating coordinate conversion parameters based on the similar points by the extractor, and applying information representing the coordinate conversion parameters to the second input of the extractor; and a synthesizing unit for synthesizing the plurality of images based on the information representing the coordinate conversion parameters generated by said generating unit.

18. An image synthesizing apparatus for synthesizing a plurality of images, comprising:

an input for inputting the plurality of images;

a generating unit for generating a process list by detecting those ones of the images which at least partially overlap with another selected image, and, for at least one detected image, by detecting those ones of the images which at least partially overlap with said detected images, and which have not already been detected or selected;

a detecting unit for detecting position relationships between said images which have been detected or selected by said generating unit;

a determining unit for determining conversion parameters based on the position relationships detected by said detecting unit;

a selecting unit for selecting a reference image;

a converting unit for converting at least one of said parameters determined by said determining unit with respect to the reference image selected by said selecting unit; and a synthesizing unit for synthesizing all of the images on the basis of the conversion parameters converted by said converting unit.

* * * * *

UNITED STATES PATENT AND TRADEMARK OFFICE
CERTIFICATE OF CORRECTION

PATENT NO. : 6,714,689 B1
DATED : March 30, 2004
INVENTOR(S) : Koutaro Yano et al.

It is certified that error appears in the above-identified patent and that said Letters Patent is hereby corrected as shown below:

Column 18,
Line 39, "images is" should read -- images) is --.

Column 22,
Line 30, "least of" should read -- least one of -- and "detection" should read
-- detected --;
Line 49, "another," should read -- another --;
Line 50, "one of the images," should read -- image, --;
Line 51, "one" should read -- ones --; and
Line 55, "relationship between" should read -- relationships between --.

Column 23,
Line 9, "baBed" should read -- based --;
Line 19, "another," should read -- another --;
Line 20, "one of the images," should read -- image, --;
Line 21, "one" should read -- ones --;
Lines 23, "image," should read -- images, --;
Line 40, "image" should read -- images --;
Line 49, "the" should read -- that --;
Line 57, "bein" should read -- being --;
Line 59, "A image" should read -- An image --; and
Line 63, "menas" should read -- means --.

Column 24,
Line 3, "menas" should read -- means --;
Line 4, "one" should read -- ones --;
Line 7, "base" should read -- based --;
Line 19, "version" should read -- versions --; and
Line 44, "one" should read -- ones --.

Column 25,
Line 6, "detected" should read -- detection --;
Line 9, "according" should read -- accordance --;
Line 20, "parially" should read -- partially --; and
Line 29, "base" should read -- based --.

UNITED STATES PATENT AND TRADEMARK OFFICE
CERTIFICATE OF CORRECTION

PATENT NO. : 6,714,689 B1
DATED : March 30, 2004
INVENTOR(S) : Koutaro Yano et al.

It is certified that error appears in the above-identified patent and that said Letters Patent is hereby corrected as shown below:

Column 26,
Line 4, "ot" should read -- to --; and
Line 17, "input" should read -- input unit --.

Signed and Sealed this

Third Day of May, 2005

JON W. DUDAS
*Director of the United States Patent and Trademark Office*